(12) United States Patent
Zhou et al.

(10) Patent No.: US 11,552,689 B2
(45) Date of Patent: Jan. 10, 2023

(54) STATE-BASED BEAM SWITCHING

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 16/717,066

(22) Filed: Dec. 17, 2019

(65) Prior Publication Data
US 2020/0204242 A1 Jun. 25, 2020

Related U.S. Application Data

(60) Provisional application No. 62/784,336, filed on Dec. 21, 2018.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04L 5/0051* (2013.01);
(Continued)

(58) Field of Classification Search
CPC ..... H04B 7/0695; H04B 7/088; H04L 5/0051; H04L 25/0226; H04W 24/10; H04W 72/0413
See application file for complete search history.

(56) References Cited

U.S. PATENT DOCUMENTS

2005/0202859 A1* 9/2005 Johnson ............... H04B 7/0408
455/575.7
2017/0064748 A1* 3/2017 Cai ...................... H04B 7/0619
(Continued)

FOREIGN PATENT DOCUMENTS

EP 1223691 A2 * 7/2002 ......... H04B 7/18519
EP 3614715 A1 * 2/2020 ........... H04B 7/0626
(Continued)

OTHER PUBLICATIONS

International Search Report and Written Opinion—PCT/US2019/066950—ISA/EPO—May 15, 2020.
(Continued)

*Primary Examiner* — Deepa Belur
(74) *Attorney, Agent, or Firm* — Kristine U. Ekwueme

(57) ABSTRACT

Methods, systems, and devices for wireless communications are described. Beam pair link (BPLs) may be associated with a state of a wireless device. For example, a first wireless device may communicate with a second wireless device using a set of BPLs, and the second wireless device may operate using a predetermined movement sequence, where different movements may correspond to the second wireless device using respective states. In some examples, a BPL may be selected for each state of the second wireless device and used to communicate with the first wireless device, where the BPL that corresponds to a particular state may be determined through beam training procedures. In some cases, BPLs associated with respective states may experience decreased link quality and the first wireless device may transmit a configuration that modifies the communications between the first and second wireless devices based on the affected BPLs.

60 Claims, 16 Drawing Sheets

(51) Int. Cl.
    *H04L 5/00*          (2006.01)
    *H04W 72/04*       (2009.01)
    *H04L 25/02*        (2006.01)
    *H04W 24/10*       (2009.01)

(52) U.S. Cl.
    CPC ......... *H04L 25/0226* (2013.01); *H04W 24/10* (2013.01); *H04W 72/0413* (2013.01)

(56) References Cited

U.S. PATENT DOCUMENTS

| | | |
|---|---|---|
| 2018/0115958 A1 | 4/2018 | Raghavan et al. |
| 2018/0199328 A1* | 7/2018 | Sang .................... H04W 36/06 |
| 2018/0278310 A1 | 9/2018 | Lee et al. |
| 2019/0191399 A1* | 6/2019 | Islam .................. H04W 56/009 |
| 2019/0253941 A1* | 8/2019 | Cirik ................ H04W 36/0077 |
| 2019/0289568 A1* | 9/2019 | Pajovic ..................... G01S 5/00 |
| 2020/0371239 A1* | 11/2020 | Rumala ................. G01S 7/4817 |
| 2021/0136768 A1* | 5/2021 | Kang ................ H04W 72/0466 |

FOREIGN PATENT DOCUMENTS

| | | | |
|---|---|---|---|
| WO | WO-2017196612 A1 | 11/2017 | |
| WO | WO-2018054498 A1 | 3/2018 | |
| WO | WO-2018183991 A1 | 10/2018 | |
| WO | WO-2020036521 A1 * | 2/2020 | ............. G06N 20/00 |

OTHER PUBLICATIONS

Partial International Search Report—PCT/US2019/066950—ISA/EPO—Mar. 27, 2020.

\* cited by examiner

STATE-BASED BEAM SWITCHING

CROSS REFERENCE

The present application for patent claims the benefit of U.S. Provisional Patent Application No. 62/784,336 by ZHOU et al., entitled "STATE-BASED BEAM SWITCHING," filed Dec. 21, 2018, assigned to the assignee hereof, and expressly incorporated herein.

BACKGROUND

The following relates generally to wireless communications, and more specifically to state-based beam switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations, transmission/reception points (TRPs), or network access nodes, each simultaneously supporting communication for multiple communication devices, which may be otherwise known as user equipment (UE). In some wireless communications systems, wireless devices (such as a base station and UE) may communicate using directional beams (e.g., directional transmit beams and directional receive beams) that form beam pair links (BPLs) for exchanging data packets. In some cases, the wireless devices may modify one or more BPLs used to communicate, for example, due to the mobility of one or both of the devices. However, conventional techniques for dynamically managing BPLs may be deficient.

SUMMARY

The described techniques relate to improved methods, systems, devices, and apparatuses that support state-based beam switching. Generally, the described techniques provide for associating a beam pair link (BPL) with a state of a wireless device (e.g., the position and/or orientation) for wireless communications. For example, a first wireless device (e.g., a controlling wireless device, which may be an example of a base station) may communicate with a second wireless device (e.g., a secondary wireless device, which may be an example of a user equipment (UE)) using a set of BPLs. The second wireless device may operate using a predetermined movement sequence, where the second wireless device operates in different states. As such, each state of the second wireless device may correspond to a respective BPL used to communicate with the first wireless device. The BPLs that correspond to each state may be determined by way of beam training, where the second wireless device may perform a measurements for each state to identify a BPL having a link quality that satisfies a threshold. The second wireless device may then signal, for example, via one or more measurement report, an indication of the identified BPL for each state. In such cases, the first and second wireless devices may record the BPLs that correspond with each state, and may proceed to communicate using a BPL in accordance with a present state of the second wireless device (e.g., during a series of movements). Because each state may be linked to a predetermined BPL, the first and second wireless device may refrain from retraining to identify additional BPLs each time a movement sequence of the second wireless device changes.

In some cases, one or more BPLs associated with the states of the second wireless device may experience decreased link quality (e.g., as compared to a threshold, as compared to an initial measured link quality, etc.), and the first wireless device may transmit a configuration that modifies the communications between the first and second wireless devices based on the one or more affected BPLs. For instance, the modified communication may include replacing, the one or more BPLs (e.g., for one or more corresponding states) having a decreased link quality with other BPLs with a relatively higher link quality (e.g., that satisfies a threshold). The other BPLs may be based on measurements performed by the second wireless device, for examples, in response to a request transmitted by the first wireless device upon detecting the decreased link quality. Additionally or alternatively, the modified communications may include using repeated transmissions for one or more states affected by decreased link quality. The repeated transmissions may provide for robust transmissions of data packets between the first and second wireless devices in the presence of interference. In other examples, the modification to the communications may include updating the set of states in a movement sequence to exclude states having BPLs with degraded link quality. Thus, the described techniques may provide for dynamically modifying the BPLs for respective states of the second wireless device, resulting in sustained communications efficiency for the first and second wireless device in the presence of changing communications conditions.

A method of wireless communication at a controlling wireless device is described. The method may include receiving an indication of a set of states of a secondary wireless device, each state of the set of states corresponding to at least one of a position or orientation of the secondary wireless device, determining, based on the set of states of the secondary wireless device, a set of BPLs for communicating with the secondary wireless device in the set of states, each BPL of the set of BPLs corresponding to a respective state of the set of states, and communicating with the secondary wireless device based on the set of BPLs and the set of states.

An apparatus for wireless communication at a controlling wireless device is described. The apparatus may include a processor, memory in electronic communication with the processor, and instructions stored in the memory. The instructions may be executable by the processor to cause the apparatus to receive an indication of a set of states of a secondary wireless device, each state of the set of states corresponding to at least one of a position or orientation of the secondary wireless device, determine, based on the set of states of the secondary wireless device, a set of BPLs for communicating with the secondary wireless device in the set of states, each BPL of the set of BPLs corresponding to a respective state of the set of states, and communicate with the secondary wireless device based on the set of BPLs and the set of states.

Another apparatus for wireless communication at a controlling wireless device is described. The apparatus may include means for receiving an indication of a set of states of a secondary wireless device, each state of the set of states corresponding to at least one of a position or orientation of the secondary wireless device, determining, based on the set of states of the secondary wireless device, a set of BPLs for communicating with the secondary wireless device in the set of states, each BPL of the set of BPLs corresponding to a respective state of the set of states, and communicating with the secondary wireless device based on the set of BPLs and the set of states.

A non-transitory computer-readable medium storing code for wireless communication at a controlling wireless device is described. The code may include instructions executable by a processor to receive an indication of a set of states of a secondary wireless device, each state of the set of states corresponding to at least one of a position or orientation of the secondary wireless device, determine, based on the set of states of the secondary wireless device, a set of BPLs for communicating with the secondary wireless device in the set of states, each BPL of the set of BPLs corresponding to a respective state of the set of states, and communicate with the secondary wireless device based on the set of BPLs and the set of states.

Some examples of the method, apparatuses, and non-transitory computer-readable medium described herein may further include operations, features, means, or instructions for communicating with the secondary wireless device by cycling through the set of BPLs by selecting a BPL corresponding to the respective state of the secondary wireless device.

Some examples of the method, apparatuses, and non-transitory computer-readable medium described herein may further include operations, features, means, or instructions for receiving, from the secondary wireless device, a measurement report including an indication of the each BPL corresponding to the respective state of the set of states, where determining the set of BPLs may be based on the received measurement report.

In some examples of the method, apparatuses, and non-transitory computer-readable medium described herein, determining the set of BPLs may include operations, features, means, or instructions for identifying a set of transmit beams and receive beams having a link quality that satisfies a threshold, where respective transmit beams and receive beams of the set of transmit beams and receive beams may be for communicating at least one of a control resource set (CORESET), a physical downlink shared channel (PDSCH), a physical uplink control channel (PUCCH), or a sounding reference signal (SRS).

Some examples of the method, apparatuses, and non-transitory computer-readable medium described herein may further include operations, features, means, or instructions for transmitting, to the secondary wireless device, an indication of a transmission configuration indicator (TCI) state for at least one of the CORESET or the PDSCH for a corresponding state.

Some examples of the method, apparatuses, and non-transitory computer-readable medium described herein may further include operations, features, means, or instructions for transmitting, to the secondary wireless device, an indication of a spatial relationship for at least one of the PUCCH or the SRS for a corresponding state.

In some examples of the method, apparatuses, and non-transitory computer-readable medium described herein, each state of the set of states utilizes one or more BPLs for simultaneous transmissions.

Some examples of the method, apparatuses, and non-transitory computer-readable medium described herein may further include operations, features, means, or instructions for identifying, for at least one state of the set of states, at least one BPL of the set of BPLs having a link quality that does not satisfy a threshold, and transmitting, to the secondary wireless device, a configuration that modifies communications with the secondary wireless device for the at least one state of the set of states.

Some examples of the method, apparatuses, and non-transitory computer-readable medium described herein may further include operations, features, means, or instructions for determining, based on the at least one BPL having the link quality that does not satisfy the threshold, at least one other BPL having a link quality that satisfies the threshold, and where the configuration that modifies the communications with the secondary wireless device replaces the at least one BPL with the at least one other BPL for the at least one state.

Some examples of the method, apparatuses, and non-transitory computer-readable medium described herein may further include operations, features, means, or instructions for transmitting a signal requesting the secondary wireless device perform measurements for the at least one state, and receiving, from the secondary wireless device and in response to the signal, a measurement report for the at least one state, where determining the at least one other BPL may be based on the received measurement report.

Some examples of the method, apparatuses, and non-transitory computer-readable medium described herein may further include operations, features, means, or instructions for communicating, based on the configuration, with the secondary wireless device by cycling through the set of BPLs including the at least one other BPL by selecting the BPL corresponding to the respective state of the secondary wireless device.

Some examples of the method, apparatuses, and non-transitory computer-readable medium described herein may further include operations, features, means, or instructions for transmitting, to the secondary wireless device, an indication to resume operation in accordance with the set of states, where the operation may be resumed from at least one of a beginning of the set of states or a designated state of the set of states.

Some examples of the method, apparatuses, and non-transitory computer-readable medium described herein may further include operations, features, means, or instructions for determining, based on at least one BPL having a link quality that does not satisfy a threshold, to utilize repeated transmissions for at least one state of the set of states, and transmitting, to the secondary wireless device, a configuration that modifies communications with the secondary wireless device for the at least one state of the set of states, where the configuration enables the repeated transmissions.

In some examples of the method, apparatuses, and non-transitory computer-readable medium described herein, the repeated transmissions include at least one of repetitions of a packet using a same BPL or repetitions of the packet using two or more different BPLs. In some examples of the method, apparatuses, and non-transitory computer-readable medium described herein, the repeated transmissions include simultaneous repetitions of a packet using two or more BPLs.

Some examples of the method, apparatuses, and non-transitory computer-readable medium described herein may further include operations, features, means, or instructions for determining at least one of a number of the repeated transmissions, a corresponding BPL for each repeated transmission, or corresponding BPLs for simultaneous transmissions, and where the configuration that modifies the communications with the secondary wireless device includes an indication of at least one of the number of the repeated transmissions, the corresponding BPL for each repeated transmission, or the corresponding BPLs for the simultaneous transmissions.

Some examples of the method, apparatuses, and non-transitory computer-readable medium described herein may further include operations, features, means, or instructions for identifying, for at least one state of the set of states, at least one BPL of the set of BPLs having a link quality that does not satisfy a threshold, and transmitting, to the secondary wireless device, a configuration that modifies communications with the secondary wireless device for the at least one state of the set of states, the configuration including an adjusted set of states that excludes the at least one state.

Some examples of the method, apparatuses, and non-transitory computer-readable medium described herein may further include operations, features, means, or instructions for transmitting, to the secondary wireless device, a configuration of an order of the set of states, and communicating with the secondary wireless device by cycling through the set of BPLs by selecting a BPL corresponding to the respective state in accordance with the order of the set of states.

A method of wireless communication at a secondary wireless device is described. The method may include transmitting, to a controlling wireless device, an indication of a set of states of the secondary wireless device, each state of the set of states corresponding to at least one of a position or orientation of the secondary wireless device, determining, based on the set of states of the secondary wireless device, a set of BPLs for communicating with the controlling wireless device in the set of states, each BPL of the set of BPLs corresponding to a respective state of the set of states, and communicating with the controlling wireless device based on the set of BPLs and the set of states.

An apparatus for wireless communication at a secondary wireless device is described. The apparatus may include a processor, memory in electronic communication with the processor, and instructions stored in the memory. The instructions may be executable by the processor to cause the apparatus to transmit, to a controlling wireless device, an indication of a set of states of the secondary wireless device, each state of the set of states corresponding to at least one of a position or orientation of the secondary wireless device, determine, based on the set of states of the secondary wireless device, a set of BPLs for communicating with the controlling wireless device in the set of states, each BPL of the set of BPLs corresponding to a respective state of the set of states, and communicate with the controlling wireless device based on the set of BPLs and the set of states.

Another apparatus for wireless communication at a secondary wireless device is described. The apparatus may include means for transmitting, to a controlling wireless device, an indication of a set of states of the secondary wireless device, each state of the set of states corresponding to at least one of a position or orientation of the secondary wireless device, determining, based on the set of states of the secondary wireless device, a set of BPLs for communicating with the controlling wireless device in the set of states, each BPL of the set of BPLs corresponding to a respective state of the set of states, and communicating with the controlling wireless device based on the set of BPLs and the set of states.

A non-transitory computer-readable medium storing code for wireless communication at a secondary wireless device is described. The code may include instructions executable by a processor to transmit, to a controlling wireless device, an indication of a set of states of the secondary wireless device, each state of the set of states corresponding to at least one of a position or orientation of the secondary wireless device, determine, based on the set of states of the secondary wireless device, a set of BPLs for communicating with the controlling wireless device in the set of states, each BPL of the set of BPLs corresponding to a respective state of the set of states, and communicate with the controlling wireless device based on the set of BPLs and the set of states.

Some examples of the method, apparatuses, and non-transitory computer-readable medium described herein may further include operations, features, means, or instructions for communicating with the controlling wireless device by cycling through the set of BPLs by selecting a BPL corresponding to the respective state of the secondary wireless device. Some examples of the method, apparatuses, and non-transitory computer-readable medium described herein may further include operations, features, means, or instructions for performing a set of measurements for each state of the set of states, and transmitting, to the controlling wireless device, a measurement report including an indication of the each BPL corresponding to the respective state of the set of states, where determining the set of BPLs may be based on the set of measurements.

In some examples of the method, apparatuses, and non-transitory computer-readable medium described herein, determining the set of BPLs may include operations, features, means, or instructions for identifying a set of transmit beams and receive beams having a link quality that satisfies a threshold, where respective transmit beams and receive beams of the set of transmit beams and receive beams may be for communicating at least one of a CORESET, PDSCH, a PUCCH, or an SRS.

Some examples of the method, apparatuses, and non-transitory computer-readable medium described herein may further include operations, features, means, or instructions for receiving, from the controlling wireless device, an indication of a TCI state for at least one of the CORESET or the PDSCH for a corresponding state, and identifying transmit beams and receive beams corresponding to at least one of the CORESET or the PDSCH based on the received indication.

Some examples of the method, apparatuses, and non-transitory computer-readable medium described herein may further include operations, features, means, or instructions for receiving, from the controlling wireless device, an indication of a spatial relationship for at least one of the PUCCH or the SRS for a corresponding state, and identifying transmit beams and receive beams corresponding to at least one of the PUCCH or the SRS based on the received indication. In some examples of the method, apparatuses, and non-transitory computer-readable medium described herein, each state of the set of states utilizes one or more BPLs for simultaneous transmissions.

Some examples of the method, apparatuses, and non-transitory computer-readable medium described herein may further include operations, features, means, or instructions for receiving, from the controlling wireless device, a configuration that modifies communications with the controlling wireless device for at least one state of the set of states, the configuration received based on at least one BPL of the set of BPLs having a link quality that does not satisfy a threshold.

In some examples of the method, apparatuses, and non-transitory computer-readable medium described herein, the configuration that modifies the communications with the controlling wireless device replaces the at least one BPL with at least one other BPL having a link quality that satisfies the threshold for the at least one state.

Some examples of the method, apparatuses, and non-transitory computer-readable medium described herein may further include operations, features, means, or instructions for receiving a signal requesting the secondary wireless device perform measurements for the at least one state, performing a set of measurements for the at least one state, and transmitting, to the controlling wireless device and in response to the signal, a measurement report for the at least one state, where the at least one other BPL may be based on the set of measurements.

Some examples of the method, apparatuses, and non-transitory computer-readable medium described herein may further include operations, features, means, or instructions for communicating, based on the configuration, with the controlling wireless device by cycling through the set of BPLs including the at least one other BPL by selecting the BPL corresponding to the respective state of the secondary wireless device.

Some examples of the method, apparatuses, and non-transitory computer-readable medium described herein may further include operations, features, means, or instructions for receiving, from the controlling wireless device, an indication to resume operation in accordance with the set of states, where the operation may be resumed from at least one of a beginning of the set of states or a designated state of the set of states.

Some examples of the method, apparatuses, and non-transitory computer-readable medium described herein may further include operations, features, means, or instructions for receiving, from the controlling wireless device, a configuration that modifies communications with the controlling wireless device for at least one state of the set of states, where the configuration enables repeated transmissions based on at least one BPL of the set of BPLs having a link quality that does not satisfy a threshold.

In some examples of the method, apparatuses, and non-transitory computer-readable medium described herein, the repeated transmissions include at least one of repetitions of a packet using a same BPL or repetitions of the packet using two or more different BPLs. In some examples of the method, apparatuses, and non-transitory computer-readable medium described herein, the repeated transmissions include simultaneous repetitions of a packet using two or more BPLs.

In some examples of the method, apparatuses, and non-transitory computer-readable medium described herein, the configuration that modifies the communications with the controlling wireless device includes an indication of at least one of a number of repeated transmissions, a corresponding BPL for each repeated transmission, or a corresponding BPLs for simultaneous transmissions.

Some examples of the method, apparatuses, and non-transitory computer-readable medium described herein may further include operations, features, means, or instructions for receiving, from the controlling wireless device, a configuration that modifies communications with the controlling wireless device for at least one state of the set of states based on at least one BPL of the set of BPLs having a link quality that does not satisfy a threshold, the configuration including an adjusted set of states that excludes the at least one state.

Some examples of the method, apparatuses, and non-transitory computer-readable medium described herein may further include operations, features, means, or instructions for receiving, from the controlling wireless device, a configuration of an order of the set of states, and communicating with the controlling wireless device by cycling through the set of BPLs by selecting a BPL corresponding to the respective state in accordance with the order of the set of states.

DETAILED DESCRIPTION

Figure 1:
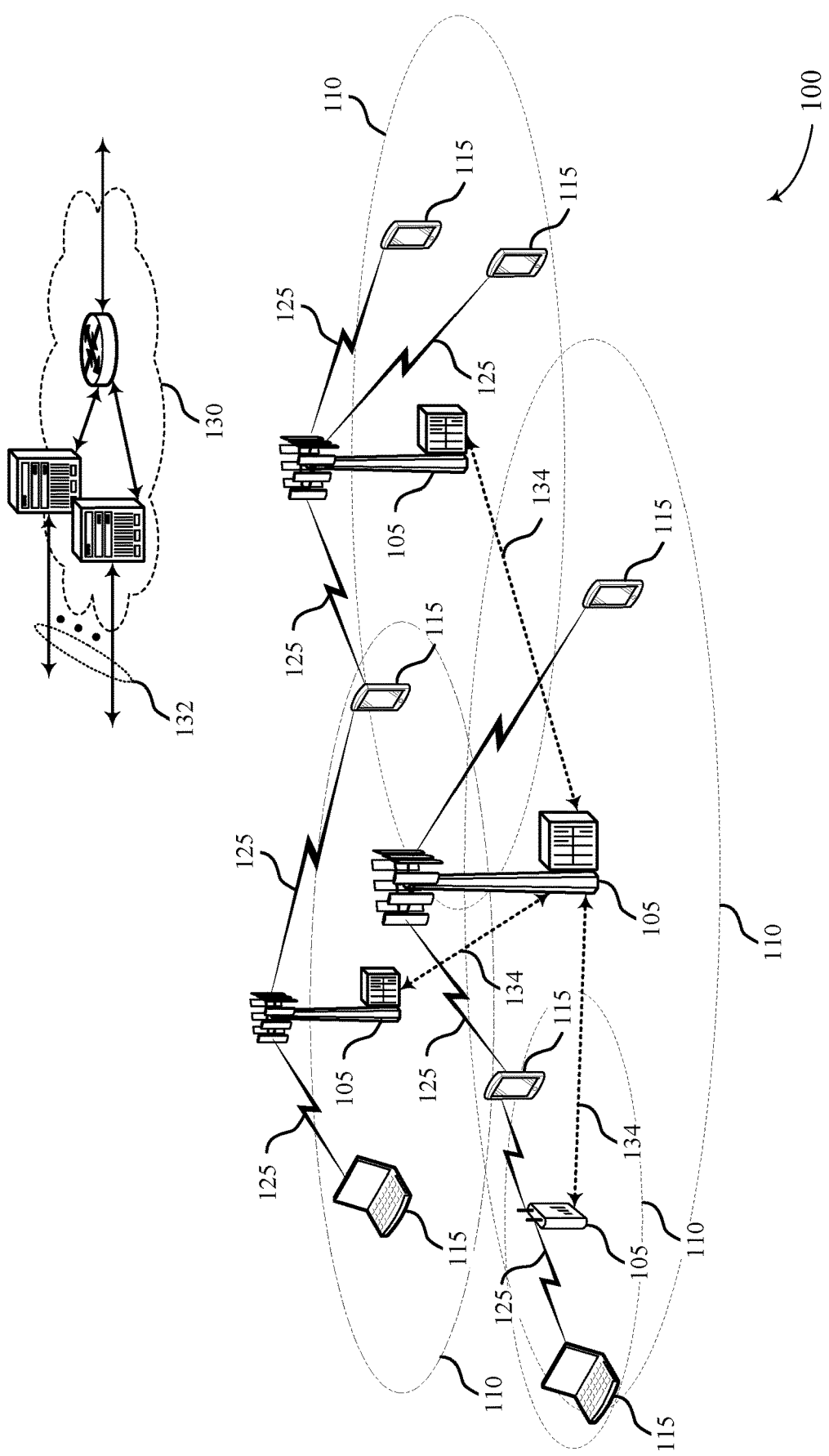
FIG. 1 illustrates an example of a wireless communications system that supports state-based beam switching in accordance with aspects of the present disclosure.

Some wireless communication systems may operate in millimeter wave (mmW) frequency ranges, e.g., 25 gigahertz (GHz), 40 GHz, 60 GHz, etc. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via directional beams (e.g., beamformed for transmission and reception using an antenna array at the wireless device). For example, two or more wireless devices may communicate via beam pair links (BPLs), where each BPL includes a transmit beam of one wireless device (e.g., a user equipment (UE)) and a receive beam of another wireless device (e.g., a base station, another UE, a transmission/reception point (TRP), etc.).

In some systems, such as systems that support industrial Internet of Things (IoT), wireless devices may switch between different BPLs, for example, based on the movement and/or location of the wireless device. A wireless device, such as a UE, may perform a series of movements for a certain task or process that it is programmed to complete, and such operation of the UE may be predetermined and/or repeated by the UE. As such, BPL switching performed by the UE and base station may also be predetermined. The BPL switching may include cyclically changing BPLs at respective times (or time intervals) within a communication time period, which may be based on the location or position of the UE.

However, different movement sequences performed by the UE 115 may be based on the configuration (or re-configuration) of different communication time periods and/or different sets of BPLs for communications. Such additional retraining may be performed to update BPLs associated with the communication time period each time a movement sequence changes. But the additional retraining each time a movement pattern changes may introduce inefficiencies and complexity into the system, thereby adding latency to operational procedures.

As described herein, retraining for different movement patterns may be avoided through the use of state-based BPL configurations. For example, the movements of a UE may be split into respective states, with each state describing a location and/or orientation of the UE. A BPL having a highest link quality (e.g., as compared to other possible BPLs, as compared to a threshold, etc.) may be determined for each state through a beam training process that configures each states of the UE with one or more BPLs. The BPL configuration may be stored by both the UE and the base station, and the UE and the base station may communicate using the BPL for each state the UE operates in during a movement pattern. Through the use of BPL switching techniques based on the state of a wireless device, any number of movement patterns may be configured for a wireless device (while avoiding beam training before operating using a changed movement pattern), as the wireless device may cycle through one or more states and communicate using predetermined BPLs for each state.

In some examples, the UE may operate in an environment that dynamically changes from the time the training of BPLs is performed. For example, in the industrial IoT environment, a particular BPL may be blocked or interfered with by other objects or other devices during operation, which may thus affect at least one of the pre-determined BPLs at a corresponding state of the UE. As a result, one or more predetermined BPLs may experience decreased performance at least in some portion of a movement sequence incorporating that state. As a result, predetermined BPLs that may have previously satisfied a link quality threshold, may later fail to provide a sufficient communication link between the UE and a base station.

In such cases, if a predetermined BPL has a degraded link quality for a certain state, a base station may update affected with one or more other BPLs. For example, upon detection of at least one BPL (and corresponding state) having decreased link quality (e.g., as compared to an initial quality, a previously determined quality, a threshold, etc.), a base station may signal the 115 to perform measurements for the state (e.g., based on the decreased link quality detected in that state). The UE may transmit a measurement report, and the base station may determine an updated BPL for the state, where the updated BPL may replace a BPL that is experiencing decreased link quality.

Additionally or alternatively, the UE and base station may use communications techniques that enable repeated transmissions during the state(s) experiencing decreased link quality. For example, when signaling a configuration for a set of states, a base station may signal that the UE may transmit and receive repetitions of a packet during respective states affected by decreased link quality. The repeated transmissions may include sending repetitions of the packet with a same BPL, or with different BPLs while in a state. Additionally or alternatively, a same packet may be simultaneously transmitted and received using multiple BPLs. In other cases, a base station may use multiple BPLs to simultaneously transmit a repeated packet to the UE in a state, and the UE may likewise receive the packet using multiple panels (and multiple BPLs). In some examples, the base station may update an entire movement sequence such that states (and corresponding BPLs) affected by interference may be excluded from the movement sequence. In any event, after an updated configuration for the BPLs used in one or more states of the UE, the base station may signal the UE to resume operation by starting from an initial state, or resume at a particular state in a movement sequence.

Particular aspects of the subject matter described herein may be implemented to realize one or more advantages. The described techniques may support improvements in communication between the UE and the base station by increasing the link quality of degraded BPLs. For example, establishing new BPLs via beam training of the UE and BS in relation to the UEs state may replace the degraded BPLs, and therefore the communication efficiency between the UE and the base station may be increased. As such, the supported techniques may include improved UE operations, improved base station operations, and may promote network efficiencies, among other benefits.

Aspects of the disclosure are initially described in the context of wireless communications systems. Further examples are then described in the context of motion control for state determination, predetermined movements using state-based BPLs, and adaptation of the same. Aspects of the disclosure are further illustrated by and described with reference to apparatus diagrams, system diagrams, and flowcharts that relate to state-based beam switching.

FIG. 1 illustrates an example of a wireless communications system 100 that supports state-based beam switching in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in some examples, in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or Resource Blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit synchronization signal (SS) sequences to multiple UEs 115, and a UE 115 may attempt to detect the SS sequences by correlating received SS signals with the SS sequences. In some examples, the SSs may be transmitted by the base station 105 using one or more SS blocks (e.g., time-frequency resources used for the transmission of SSs). For example, a primary synchronization signal (PSS), secondary synchronization signal (SSS), and/or broadcast information (e.g., a physical broadcast channel (PBCH)) may be transmitted within different SS blocks on respective directional beams or on different time/frequency resources. In some cases, one or more SS blocks may be included within an SS burst. Additionally, SS blocks may be quasi-co located (QCL'ed) with other signals or resources transmitted within wireless communications system 100.

A UE 115 may be configured with one or more transmission configuration indicator (TCI) state configurations. Different TCI states, distinguished by different values of the TCI, may correspond to quasi co-location (QCL) relationships with different reference signal transmissions. For example, each TCI state may be associated with one of the previously received reference signals. The TCI state may provide a spatial QCL reference that the UE 115 can use to set the receive beam. By configuring the TCI states at the UE 115, the base station 105 can dynamically select beams for downlink transmission to the UE 115, and the UE 115 can select the corresponding receive beam to receive the downlink transmission. For a downlink transmission, the base station 105 may transmit an indication of the TCI state to the UE 115, and the UE 115 may select the corresponding receive beam based on the indicated TCI state to receive the downlink transmission. The TCI states may be configured via higher layer signaling.

In some cases, a UE 115 may be configured with one or more control-resource sets (CORESETs), where each CORESET may be associated with a particular mapping between control channel elements (CCEs) and contiguous resource element groups (REGs). A CORESET may include a number of RBs in the frequency domain and a number of symbols in the time domain. For instance, CORESETs may be configured for the transmission of control information (e.g., a physical downlink control channel (PDCCH)), for example, in one or more contiguous symbols in the time domain and one or more contiguous or non-contiguous resources in the frequency domain. In some cases, resource elements (REs) in a CORESET may be organized in REGs, where each REG includes 12 REs of a symbol period in an RB. In some cases, CORESETs may be configured for the UE 115 using higher-layer parameters (e.g., RRC signaling).

PDCCH carries downlink control information (DCI) in CCEs, which may include nine logically contiguous REGs, where each REG contains four REs. DCI includes information regarding downlink scheduling assignments, uplink resource grants, transmission scheme, uplink power control, HARQ information, a modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell-radio network temporary identifier (C-RNTI) and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

A sounding reference signal (SRS) may be transmitted by a UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, the SRS may be transmitted during a temporally last OFDM symbol of the subframe or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

When first attempting to connect to a base station 105, a UE 115 may monitor a default initial access bandwidth defined by a master information block (MIB) received from the base station 105. In some cases, the initial access bandwidth may be referred to as an initial downlink bandwidth part (BWP), a bandwidth of a first CORESET (e.g., CORESET #0), or a BWP configured by MIB. The UE 115 may receive the MIB via higher layer signaling (e.g., RRC signaling) from base station 105. Additionally, the MIB may indicate an SIB1 within the initial access bandwidth, and the SIB1 may provide a cell specific configuration of a control channel common search space (e.g., PDCCH common search space) within the initial access bandwidth for the UE 115 to monitor for control information. The PDCCH common search spaces may include control information to schedule the SIB1, OSI, paging information, random access related physical downlink shared channels (PDSCHs), or the like. In some cases, CORESETs and search spaces may be considered control resources.

A BWP may be a bandwidth that the UE 115 can transmit and receive information, where the bandwidth for the BWP may be a subset of a total available bandwidth for communications between the UE 115 and the base station 105. In some examples, a maximum number of four (4) BWPs may be configured for a UE 115, and the UE 115 may be required to monitor a single active BWP at a time. As described herein, during initial access, the UE 115 may monitor a default bandwidth for a MIB, where the default bandwidth may be referred to as the initial access bandwidth. The MIB may be carried by a physical broadcast channel (PBCH), where the PBCH is transmitted together with synchronization signals in an SS Block (e.g., an SS/PBCH block).

Wireless communications system 100 may support the association of different BPLs with respective states (e.g., the position and/or orientation) of a wireless device for wireless communications. For example, a first wireless device (e.g., a controlling wireless device, which may be an example of a base station 105) may communicate with a second wireless device (e.g., a secondary wireless device, which may be an example of a UE 115) using a set of BPLs. The second wireless device may operate using a predetermined movement sequence (such as for different tasks performed by a robot or machine in a factory or warehouse), where the second wireless device operates in different states that correspond to a particular orientation of the device. In some aspects, each state of the second wireless device may correspond to a respective BPL used to communicate with the first device.

The BPLs that correspond to each state may be determined by way of beam training, where the second wireless device may perform a measurements for each state to identify a BPL having a link quality that satisfies a threshold. The second wireless device may then signal, for example, via one or more measurement reports, an indication of the identified BPL for each state. In such cases, the first and second wireless devices may record the BPLs that correspond with each state, and may proceed to communicate using a BPL in accordance with a present state of the second wireless device (e.g., during a series of movements). Because each state may be linked to a predetermined BPL, the first and second wireless device may refrain from retraining to identify additional BPLs each time the movement sequence of the second wireless device changes.

In some cases, one or more BPLs associated with the states of the second wireless device may experience decreased link quality (e.g., as compared to a threshold, as compared to an initial measured link quality, etc.), and the first wireless device may transmit a configuration that modifies the communications between the first and second wireless devices based on the one or more affected BPLs. For instance, the modified communication may include replacing, the one or more BPLs (e.g., for one or more corresponding states) having a decreased link quality with other BPLs with a relatively higher link quality (e.g., that satisfies a threshold). The other BPLs may be based on measurements performed by the second wireless device, for examples, in response to a request transmitted by the first wireless device upon detecting the decreased link quality. Additionally or alternatively, the modified communications may include using repeated transmissions for one or more states affected by decreased link quality. The repeated transmissions may provide for robust transmissions of data packets between the first and second devices in the presence of interference. In other examples, the modification to the communications may include updating (e.g., reprogramming) the set of states in a movement sequence to exclude states having BPLs with degraded link quality from the movement sequence. Thus, the techniques supported by wireless communications system 100 may provide for the dynamic modification of BPLs for respective states of the second wireless device, resulting in sustained communications efficiency for the first and second wireless device in the presence of changing communications conditions.

Figure 2:
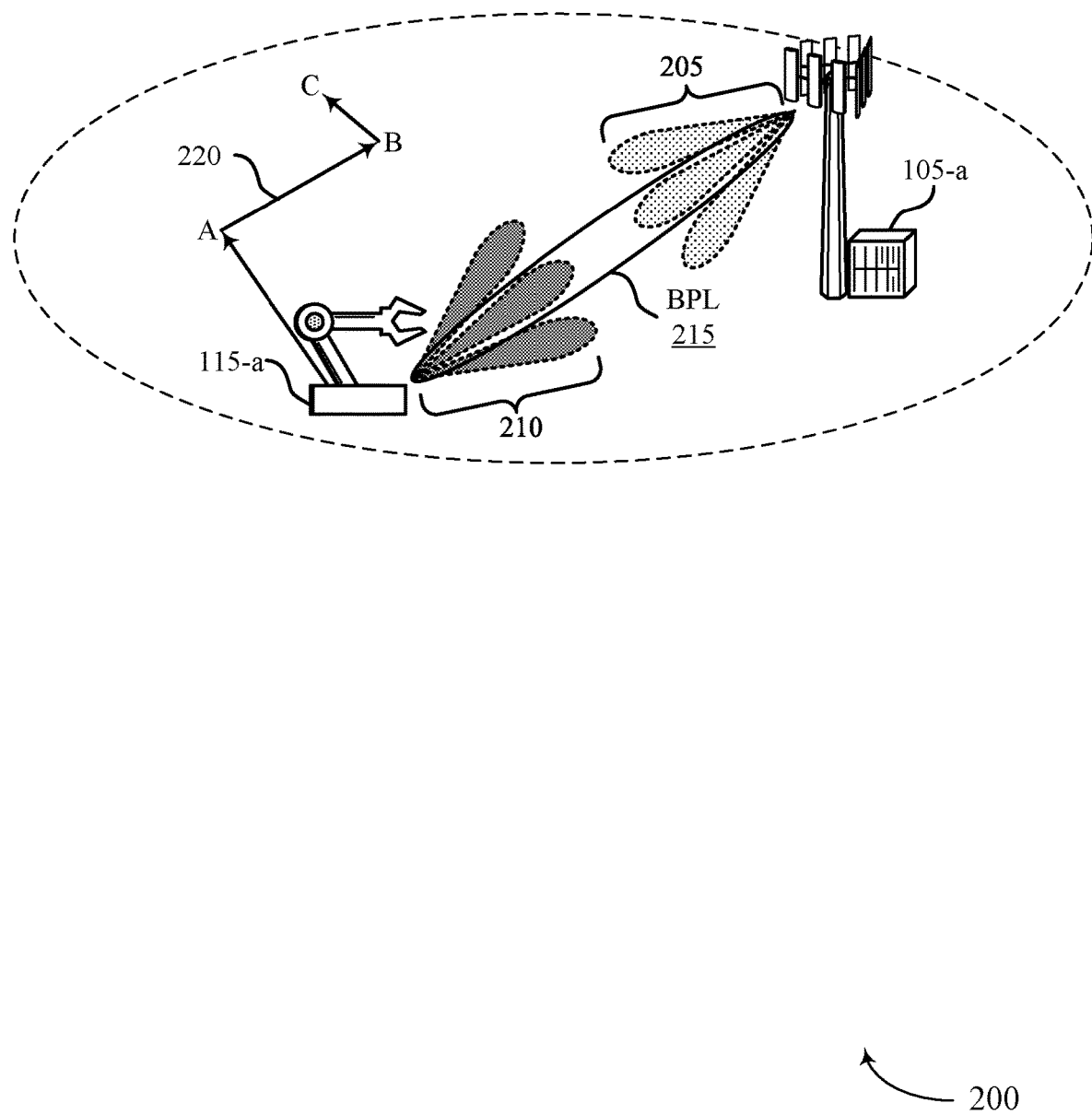
FIG. 2 illustrates an example of a wireless communications system that supports state-based beam switching in accordance with aspects of the present disclosure.

FIG. 2 illustrates an example of a wireless communications system 200 that supports state-based beam switching in accordance with aspects of the present disclosure. In some examples, wireless communications system 200 may implement aspects of wireless communications system 100. For example, wireless communications system may include a base station 105-a and a UE 115-a, which may be examples of the corresponding devices described with reference to FIG. 1. In some cases, wireless communications system 200 may be an example of a system that supports industrial IoT, and UE 115-a may be an example of a machine or robot capable of performing a specified task or operation. Further, base station 105-a may be an example of a device that controls the operation of behavior of UE 115-a. Wireless communications system 200 may support the BPL switching based on a set of states of UE 115-a, where each state of the set of state may correspond to a different BPLs used to communicate with base station 105-a. As a result, the use of stat-base beam switching may provide for adaptable communications while UE 115-a is mobile.

In wireless communications system 200, base station 105-a and UE 115-a may communicate using directional beams. For example, base station 105-a may use beamforming techniques to form a set of base station beams 205 used for transmitting and receiving wireless signals. Likewise, UE 115-a may form a set of UE beams 210 for transmitting and receiving wireless signals. In some cases, UE 115-a and base station 105-a may perform procedures to identify one or more beams that provide a highest signal or link quality (e.g., compared to other beams within a set of base station beams 205 and UE beams 210), which may include the measurement of one or more reference signals (e.g., channel state information reference signal CSI-RS, SS Blocks, etc.) transmitted by base station 105-a. UE 115-a and base station 105-a may each identify one or more pairs of corresponding beams that provide a link to communicate data between the devices. As such, UE 115-a and base station 105-a may establish a communication link using a beam pair link 215.

As an example of establishing a communication link, the BPL 215 may include a transmission beam formed by the transmitting entity and directional listening implemented by the receiving entity. For example, in downlink communications, base station 105-a may use a phased-array antenna to form a directional transmission beam and UE 115-a may use directional listening. In some cases, a base station beam 205 (e.g., directional listening beam or transmission beam) formed by base station 105-a may be larger than a UE beam 210 (e.g., a transmission beam or direction listening) formed by UE 115-a (e.g., because base station 105-a may have a larger array of antennas to perform beamforming). In uplink communications, the roles of base station 105-a and UE 115-a may be reversed. In some cases, wireless communications system 200 may operate in shared radio frequency band spectrum. As such, wireless communications system 200 may use contention-based protocols to gain access communication resources. In other examples, wireless communications system 200 may operate in licensed radio frequency spectrum bands, where communications may be scheduled by base station 105-a.

UE 115-a and base station 105-a may switch between different BPLs 215, for example, based on the movement and/or location of UE 115-a. As an example, UE 115-a may be an example of a machine or robot operating within a factory or warehouse. UE 115-a may perform a series of movements for a certain task or process that it is programmed to complete. In some cases, this operation of UE 115-a may be predetermined (e.g., preconfigured), and UE 115-a may repeat these predetermined movements. For instance, UE 115-a may move between points (e.g., points A, B, and C, as illustrated) in accordance with a predetermined set of movements. As such, BPL switching performed by UE 115-a and base station may likewise be predetermined (e.g., to reduce overhead associated with beam switch measurements, reporting, signaling, etc.). BPL switching may include cyclically adjusting or changing BPLs 215 at respective times (or time intervals), for example, within a communication time period, which may be based on the location or position of UE 115-a.

To determine the predetermined BPL switching configuration for a communication time period, UE 115-a may perform the predetermined movements during a measurement period. UE 115-a and base station 105-a may record BPLs 215 that have a link quality that satisfies a threshold (e.g., a threshold associated with a reference signal received power (RSRP), reference signal received quality (RSRQ), block error rate (BLER), signal to noise ratio (SNR), signal to interference-plus-noise ratio (SINR), or the like), where each measurement may be performed at respective times of the measurement period. That is, UE 115-a and base station 105-a may perform a beam training procedure to identify BPLs 215 having a highest link quality (as compared to other possible BPLs 215) corresponding to each movement of the UE 115-a for a particular movement pattern. In some cases, UE 115-a and base station 105-a may sweep through the set of UE beams 210 and base station beams 205, respectively, to identify the BPLs 215 having the highest link quality. Further, while in normal operation (e.g., operating outside of a measurement/training period), UE 115-a may repeat the same series of predetermined movements, while both base station 105-a and UE 115-a switch BPLs 215 at each predetermined time based on the communication time period.

However, different movement patterns performed by UE 115-a may require the configuration (or re-configuration) of different communication time periods and/or different sets of BPLs for communications. For instance, should UE 115-a perform movements to other points (e.g., associated with a movement pattern different from moving from A to B to C), then UE 115-a and base station 105-a may perform additional training for the modified movement pattern. Such additional retraining may be performed to update BPLs associated with the communication time period each time a movement sequence changes. As a result, performing retraining each time a movement pattern changes may introduce inefficiencies and complexity into the system.

As described herein, retraining for different movement patterns may be avoided through the use of state-based BPL configurations. For example, the movements of UE 115-a may be split into respective states, with each state describing a location and/or orientation of UE 115-a. A BPL having a highest link quality (e.g., as compared to other possible BPLs, as compared to a threshold, etc.) may be determined for each state through a single beam training that configures the states with a set of BPLs. The set of BPLs may be stored by (or configured for) both UE 115-a and base station 105-a, and UE 115-a and base station 105-a may communicate using the BPL for each state UE 115-a operates in during a movement pattern. Through the use of techniques based on the state of a wireless device, any number of movement patterns may be configured for the device without first performing beam training (or retraining) before operating using a different movement pattern, as the wireless device may cycle through one or more states and communicate using the predetermined BPL(s) for each state.

It is noted that the operations described herein performed by a UE 115 and base station 105 may be respectively performed by a UE 115, a base station 105, or another wireless device, and the examples shown should not be construed as limiting. For instance, the operations shown as performed by base station 105-a may be performed by a UE 115, a TRP, or another wireless device.

Figure 3:
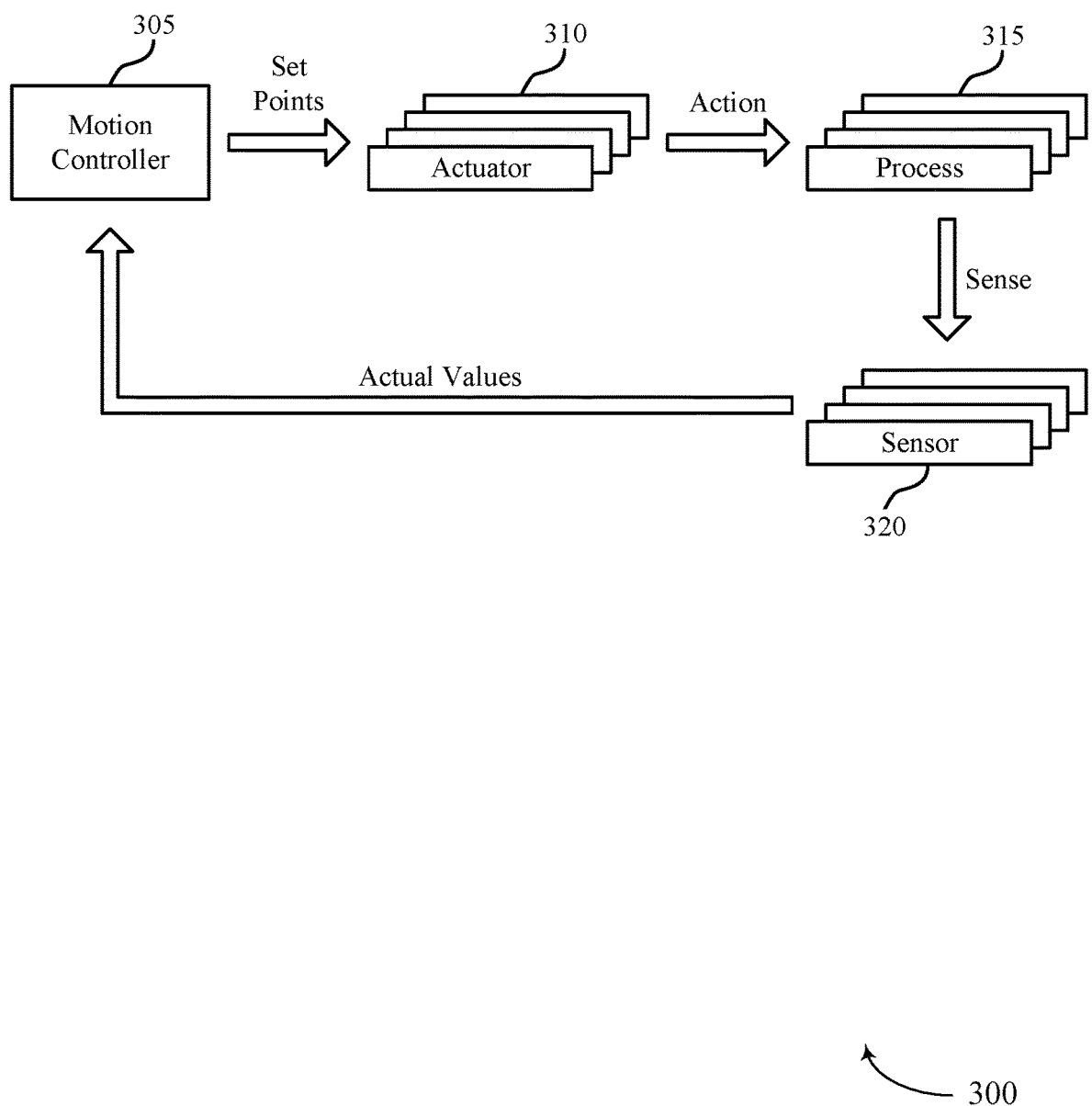
FIG. 3 illustrates an example of motion control in a system that supports state-based beam switching in accordance with aspects of the present disclosure.

FIG. 3 illustrates an example of motion control 300 in a system that supports state-based beam switching in accordance with aspects of the present disclosure. In some examples, the motion control 300 may be performed by one or more wireless devices, such as a UE 115, a base station 105, a TRP, or other wireless devices, as described with reference to FIGS. 1 and 2. For example, motion control 300 may include functions performed by a motion controller 305, one or more actuators 310, one or more processes 315, and one or more sensors 320. In such cases, the motion controller 305 may be an example of a component and/or functions implements at a secondary wireless device, such as a UE 115. Additionally, the one or more actuators 310, the one or more processors 315, and the one or more sensors 320 may also comprise components and/or functions implemented at the secondary wireless device. It is also noted that the device may include additional or different components or functions used to perform the techniques described herein.

Some wireless communications systems may implement motion control 300 for wireless devices, such as system supporting industrial IoT. Motion control systems may include the use of cyclic communications based on predetermined motions and movements of a wireless device. In such cases, the motion controller 305 may periodically transmit an indication of a set of points to the one or more actuators 310. The one or more actuators 310 may be an example of a linear actuator, a servo drive, or the like. The one or more actuators 310 may subsequently perform a corresponding action on the one or more processes 315. For instance, the action may include a movement or rotation of a certain component or different components of a device.

Further, the one or more sensors 320 may simultaneously determine a current state of the one or more processes 315. As one example, the one or more sensors 320 may sense a current position, orientation, and/or rotation of one or more component of the device. The one or more sensors 320 may transmit the sensed values (e.g., the actual values) back to the motion controller 305, which may identify the orientation or position of the device (e.g., a state). Such motion control processes may be performed in a cyclic and deterministic manner, such that, during a communication cycle time (e.g., $T_{cycle}$), the motion controller 305 may send updated set points (e.g., based on the feedback received from the one or more sensors 320) to the one or more actuators 310. The one or more sensors 320 may then send the actual values associated with the one or more processes 315 to the motion controller 305 to compete the cycle. In some examples, the communication cycle time may be less than or equal to 50 μs.

In some cases, aspects of motion control 300 may be used to determine one or more states of a device, such as states of a UE 115. These states may correspond to respective positions, rotations, movements, orientations, or a combination thereof, of the UE 115. The states may further be used to determine a BPL for communications while the device is in each state. As such, the aspects of motion control 300 may enable state-based BPL switching at a wireless device through the identification of particular states of a device.

Figure 4:
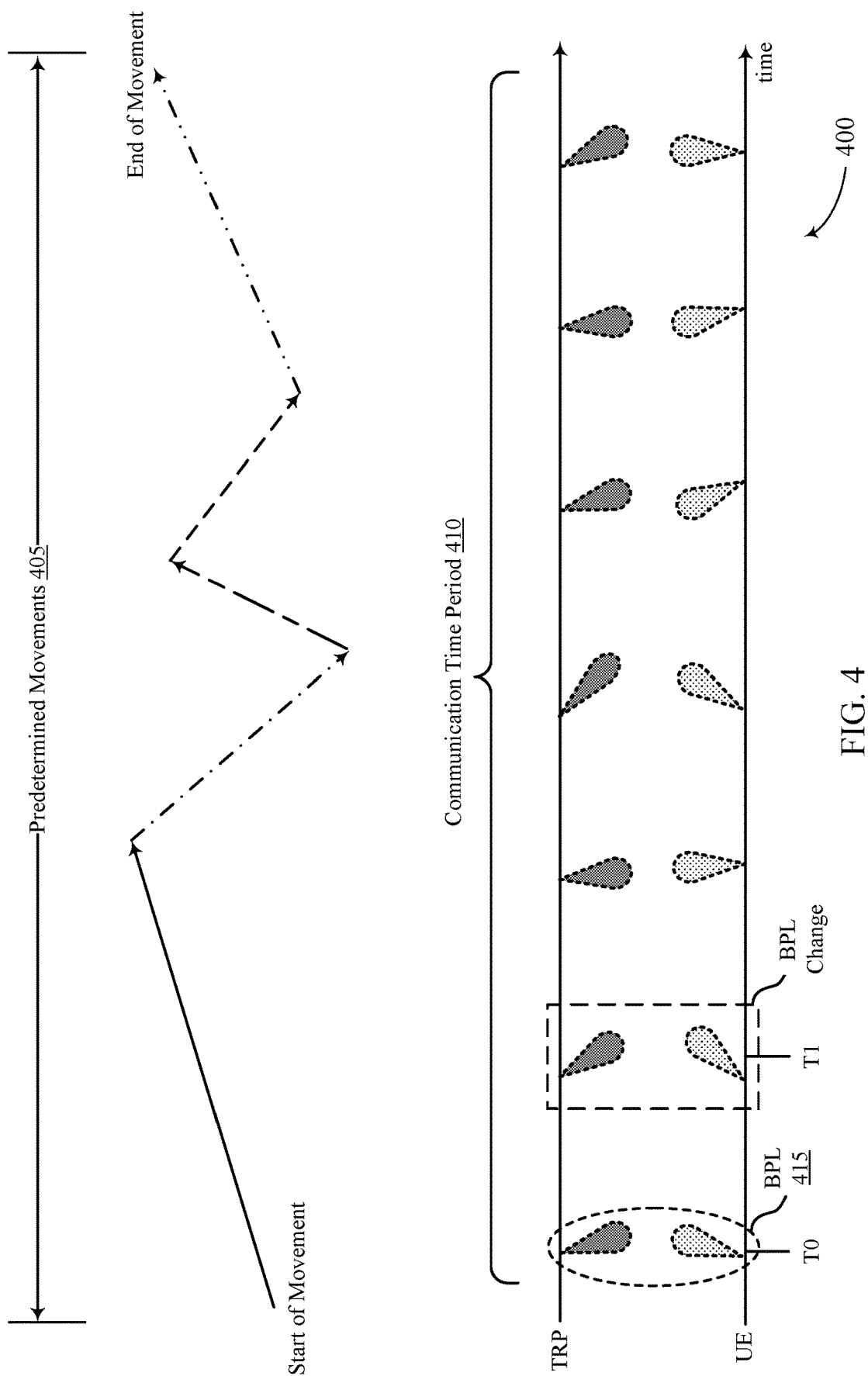
FIG. 4 illustrates an example of beam pair link (BPL) switching in a system that supports state-based beam switching in accordance with aspects of the present disclosure.

FIG. 4 illustrates an example of a BPL switching 400 that supports state-based beam switching in accordance with aspects of the present disclosure. In some examples, the BPL switching 400 may be performed by one or more wireless devices, such as a UE 115, a base station 105, a TRP, or other wireless devices, as described with reference to FIGS. 1 and 2.

BPL switching 400 may illustrate an example of predetermined movements 405 by a wireless device, such as a UE 115. For instance, the predetermined movements 405 may include a configured or programmed path that the UE 115 travels during a period of time. In some cases, the UE 115 may repeat the predetermined movements 405, or the predetermined movements 405 may be modified or changed (e.g., by a controlling wireless device, such as a base station 105) after a certain number of cycles. Additionally or alternatively, the order of movements may be reversed. As one example, the UE 115 may be an example of machinery that performs actions over a programmed path of operation. However, this is just one example, and should not be considered as limiting as other types of UEs 115 and other predetermined movements are also considered.

The predetermined movements 405 may correspond to a communication time period 410 that includes cycling through a set of BPLs 415 at respective times, and may be referred to as a BPL time trace. As mentioned above, each BPL 415 may correspond to a transmit beam and a receive beam between, for example, a UE 115 and a TRP. At the respective times of the predetermined movements 405, different BPLs 415 may be used for communication by the wireless devices. For instance, at a first time (T0), the UE 115 and TRP may communicate using a first BPL 415, whereas at a second time (T1), the BPL 415 may change to a second BPL 415. In such cases, the change of the BPL 415 may be based on the pre-determined movement of the UE 115, which may have been configured based on training/measurements performed by the UE 115 and TRP. As such the different BPLs 415 may track the UE 115 as it moves through the predetermined movements 405.

As described in more detail below, BPL switching may be configured such that a BPL change (e.g., the change of the BPL 415 at T1) is based on a current state of the UE 115. As such, the predetermined movements 405 of the UE 115 may include transitions between a set of states for different movements, and the UE 115 may use a different BPL to communicate with the TRP along a path of motion (e.g., based on a location or rotation). For example, the predetermined movements 405 may be configured as a series of states performed by the UE 115, where the UE 115 and TRP may communicate using a communication time period 410 that corresponds to the different states of the UE 115 in the predetermined movements 405 (e.g., instead of predetermined times or intervals at which the BPL 415 changes).

Figure 5:
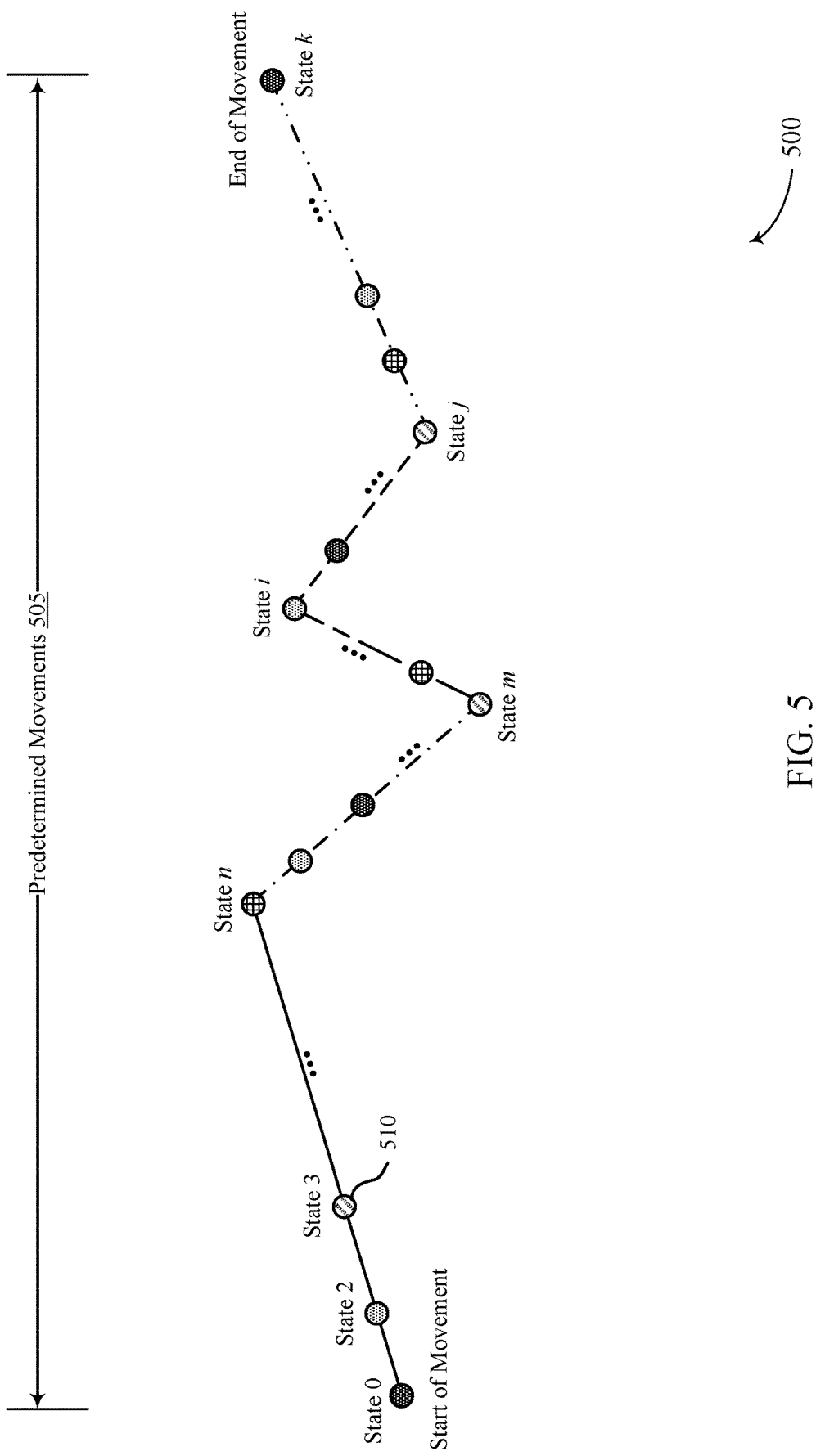
FIG. 5 illustrates an example of state transitions in a system that supports state-based beam switching in accordance with aspects of the present disclosure.

FIG. 5 illustrates an example of state transitions 500 in a system that supports state-based beam switching in accordance with aspects of the present disclosure. In some examples, the state transitions 500 may be performed by one or more wireless devices, such as a UE 115, a base station 105, a TRP, or other wireless devices, as described with reference to FIGS. 1 and 2. The state transitions 500 may be one example of predetermined movements 505 performed by a UE 115, where respective positions of the UE 115 correspond to different operational states.

In some cases, a UE 115 may perform the predetermined movements 505 based on a programmed path that the UE 115 is capable of performing over a period of time. In some cases, the UE 115 may repeat the predetermined movements 505, or the predetermined movements 505 may be modified or changed (e.g., by a controlling wireless device, such as a base station 105) after a certain number of cycles. Additionally, the UE 115 may communicate with a controlling wireless device (such as a base station 105, a TRP, or another UE 115) throughout the set of predetermined movements 505. As shown by the state transitions 500, the UE 115 may, upon starting movement, operate in one or more different states 510 along a movement path until the end of movement. Each state 510 may correspond to, for example, a location, position, placement, alignment, orientation, angle, elevation, movement, direction, or the like. The UE 115 may remain in a state for a certain period of time, or may transition between states 510 in relatively fast succession (e.g., based on the operation performed in each state). Further, each state 510 may be defined by a set of values which may be used to indicate the various states 510 of the UE 115.

As an example, a UE 115 may start the predetermined movements 505 in a first state (e.g., state 0) and, at a later time and different position of a movement path, may transition to a second, different, state (e.g., state 2). In some examples, the state 510 used at a particular location or time may be based on a current configuration or programming of the UE 115, and other states 510 may be possible for different types of predetermined movements 505. In any case, the UE 115 may continue to progress along the movement path and transition to a third state (e.g., state 3). Upon changing direction along the predetermined movements 505, the UE 115 may be in an $N^{th}$ state 510 (e.g., state n), and may proceed to transition through various states 510 (e.g., state n through state k) as the UE 115 completes the predetermined movements 505.

At each state 510, the UE 115 may utilize a different BPL configured or stored for that state 510. In such cases, both the UE 115 and the controlling wireless device (e.g., a base station 105) communicating with the UE 115 may know both the state 510 the UE 115 is currently in (based on the UE's progress in the predetermined movements 505) and the BPL link used for communications. For example, during operation, the UE 115 and base station 105 may switch to a stored or configured BPL once the UE 115 reaches the corresponding state 510. In such cases, retraining may not be needed for different movement sequences (e.g., different predetermined movements 505) as long as a BPL having a highest link quality (e.g., that satisfies a threshold) has been recorded during a training procedure. More specifically, multiple states 510 may be linked to respective BPLs that have been measured and determined to be the best BPL (e.g., as compared to other possible BPLs for that state). The base station 105 may thus program the UE 115 with any motion sequence using those states 510 without performing retraining (e.g., because all states and corresponding BPLs are known by the devices communicating).

In some cases, the UE 115 may communicate with multiple base stations 105 or TRPs using the described state-based beam change techniques, where the states of the UE 115 may be shared with multiple devices within a system. Additionally or alternatively, the UE 115 and base station 105 may use simultaneous transmissions sent using one or more BPLs for a state 510. In such cases, each state 510 may correspond to multiple BPLs that the UE 115 may use for simultaneous transmission/reception on one or more of the multiple BPLs. Here, the UE 115 may receive simultaneous data transmissions from multiple base stations 105 on one or more BPLs while in a state, and may likewise transmit data to the multiple base stations 105 on the one or more BPLs while in a state 510.

In cases where a predetermined BPL switch is based on each movement state of the UE 115, training may be performed to identify the BPL(s) that correspond to each state. As an example, a UE 115 may dwell in each state for a certain amount of time (which may be preconfigured or dynamic) to obtain a measurement of one or more transmit beams and receive beams. In such cases, the UE 115 and a base station 105 may perform a beam sweep (e.g., sweep through multiple available beams/directions) to sense a link quality of each beam. As a result, the UE 115 may report, to the base station 105, the base station transmit beam(s) or the BPLs for each state. Both the UE 115 and the base station 105 may record the reported beams that have been determined to provide a link quality that satisfies a threshold. In some cases, based on a duration of a state transition (e.g., a duration less than 1 ms), a corresponding distance the UE 115 moves may be relatively small (e.g., a transition time of less than 1 ms may correspond to less than 2 cm of movement at a speed of 20 m/s). In such cases, the BPL for each state may be approximated by using a respective state 510 either before or after the transition occurs. As an illustrative example, the transition from 2 of the predetermined movements 505 may occur relatively quickly, which may enable the use of the described approximation. As such, the determined BPL for state 2 may be determined, for example, based on either state 0 or state 3.

Figure 6:
FIG. 6 illustrates an example of beam training signaling that supports state-based beam switching in accordance with aspects of the present disclosure.

FIG. 6 illustrates an example of a beam training signaling 600 that supports state-based beam switching in accordance with aspects of the present disclosure. In some examples, beam training signaling 600 may be implemented by one or more wireless devices, such as a base station 105, a UE 115, a TRP, or other wireless device as described with reference to FIG. 1. The beam training signaling 600 may illustrate one or more fields 605 that may be signaled to and information within those fields 605 that may be stored by respective devices during a training process for respective states of a wireless device.

In some examples, when performing the described beam training for state-based BPL switching, a UE 115 and base station 105 may record a respective transmit (Tx) and receive (Rx) beams for each state, and at least for the transmission of a CORESET, PDSCH, PUCCH, SRS, or a combination thereof. As an example, during training for a particular state, at least the base station 105 may record one or more base station transmit beams (e.g., using a beam identity (ID), such as a beam index or other type of identifier) that were found to have a link quality above a threshold. Likewise, at least the UE 115 may record one or more UE receive beams (e.g., based on the beam ID, index, or the like) found to have a link quality above a threshold. In such cases, the UE 115 and/or base station 105 may signal the determined beam information such that each device is aware of the beams (and corresponding BPLs) that may be used in each state. In some examples, the UE 115 may indicate one or more beams using a measurement report sent to the base station 105.

Further, for each state, the base station 105 may signal to the UE 115 which TCI state have been selected for CORESET and PDSCH transmissions. For instance, the base station 105 may signal, using respective fields 605, a CORESET TCI state ID and a PDSCH TCI state ID. Additionally, the base station 105 may signaling which spatial relationships (such as a QCL relationship) have been selected for PUCCH and SRS transmission by the UE 115. As one example, one or more fields 605 may be used to signal a PUCCH spatial relationship ID and an SRS spatial relationship ID to the UE 115. Further, additional information, such as a state ID (e.g., identifying a respective state), a cell ID, CORESET ID, SRS resource ID, and a BWP ID, may also be signaled using one or more field 605 send from the base station 105 to the UE 115. Other information not explicitly mentioned or illustrated may also be signaled between the UE 115 and base station 105, and the examples given are provided for ease of discussion. In some examples, the information signaled by the base station 105 may enable the UE 115 to record corresponding transmit/receive beams for each state. For example, the beam training signaling 600 may be an example of a configuration used for state-based beam switching using different BPLs.

Figure 7:
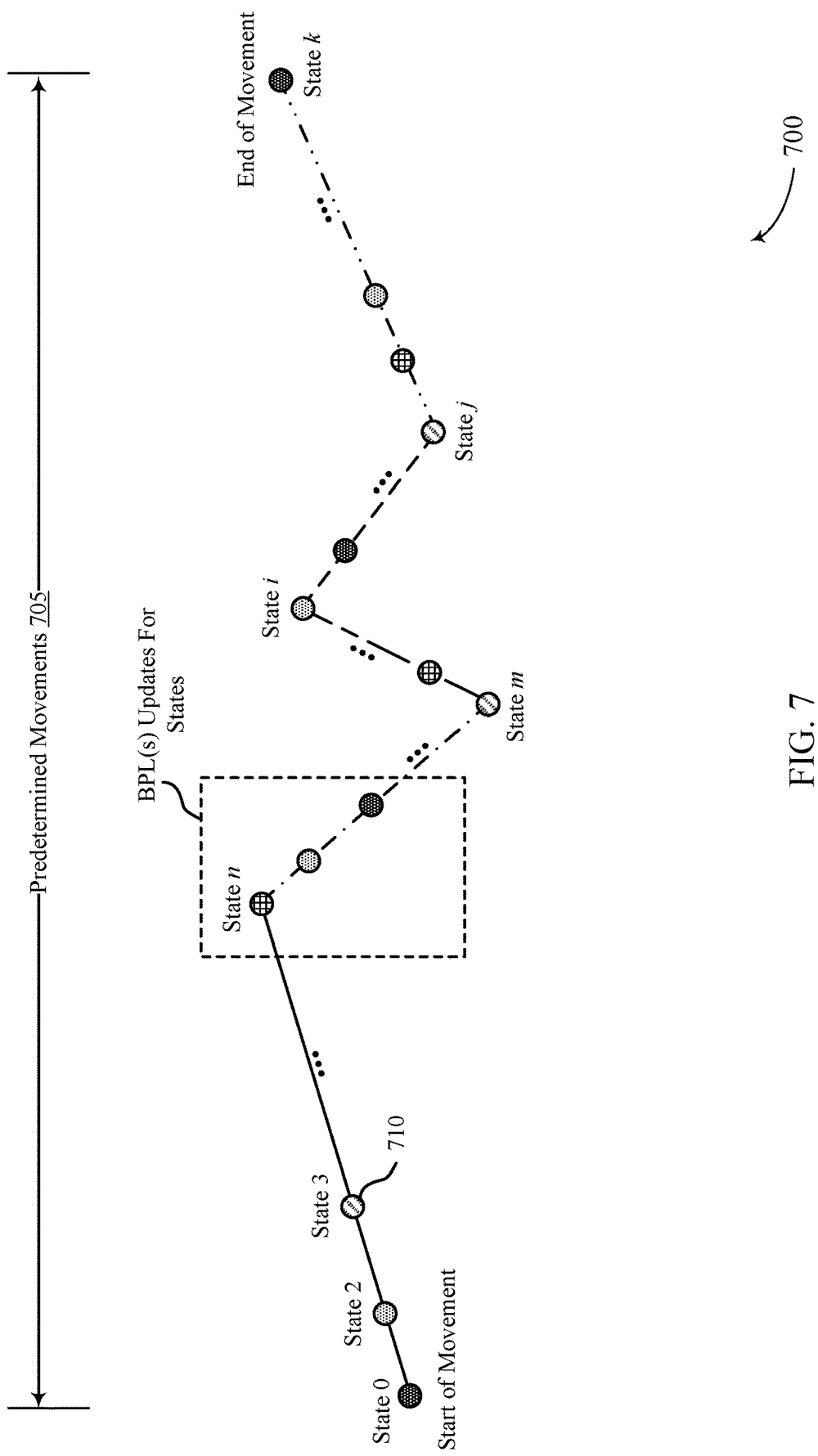
FIG. 7 illustrates an example of adaptation of state-based BPLs in a system that supports state-based beam switching in accordance with aspects of the present disclosure.

FIG. 7 illustrates an example of an adaptation of state-based BPLs 700 in a system that supports state-based beam switching in accordance with aspects of the present disclosure. In some examples, the adaptation of state-based BPLs 700 may be used for communications between one or more wireless devices, such as a UE 115, a base station 105, a TRP, or other wireless devices (such as a controlling wireless device and/or a secondary wireless device), as described with reference to FIGS. 1 and 2. As illustrated, BPLs during a set of predetermined movements 705 may be updated, for example, due to interference or signal blockage experienced at one or more states 710.

As described herein, a UE 115 may perform operations during the predetermined movements 705, where different movements or operations may correspond to different states 710 of the UE 115. Each state may also correspond to a BPL used to communicate with a controlling wireless device (e.g., a base station, TRP, or another UE 115) during the predetermined movements 705. However, the UE 115 may operate in an environment that dynamically changes from the time the training of BPLs is performed. For example, in an industrial IoT environment, a particular BPL may be blocked or interfered with by other objects or other devices during operation, which may thus affect at least one of the pre-determined BPLs at a corresponding state 710. As a result, one or more predetermined BPLs may experience poor performance at least in some portion of the predetermined movements 705. As a result, predetermined BPLs that may have previously satisfied a link quality threshold (e.g., at the time of the beam training described herein), may later fail to provide a sufficient communication link between the UE 115 and a base station 105.

In some examples, if a predetermined BPL has a degraded link quality (e.g., increased BLER, increased retransmissions, etc.) for certain states 710, a base station may update affected states 710 by re-training, with the UE 115, one or more BPLs corresponding to the state(s). For example, upon detection of at least one BPL (and corresponding state 710) having decreased link quality (e.g., as compared to an initial quality, a previously determined quality, a threshold, etc.), a base station 105 may signal the UE 115 to perform a re-training of the at least one BPL in a portion of the predetermined movements 705 (e.g., based on the decreased link quality detected in that portion). In such cases, normal operation may or may not be paused while the re-training is completed. After the re-training is completed, the base station 105 may transmit, to the UE 115, an updated set of states 710 of the predetermined movements 705 to replace a BPL corresponding to a respective state 710. As illustrated, the base station 105 may replace state n and other subsequent states 710, for example, due to decreased link quality detected for the BPLs corresponding to those states. In some cases, single states 710 may be updated or multiple states 710 may be updated.

At least one BPL having decreased link quality for a corresponding state 710 may be replaced with another BPL(s) have a relatively higher link quality. In some examples, the base station 105 may signal a request for the UE 115 to perform one or more measurements of BPLs during each affected state 710 (e.g., to identify candidate BPLs that have a link quality that satisfies the threshold). In some examples, the UE 115 may pause its operation to perform the measurements, or may continue operating while performing the measurements. The UE 115 may report the measurements to the base station 105, and the base station 105 may signal a configuration modifies communication with the UE 115. The configuration may accordingly include an indication of updated states 710 and associated BPLs. In some cases, the configuration may be signaled using semi-static signaling, such as RRC messaging or a MAC control element (MAC-CE). The BPLs for the corresponding states may be replaced with other BPLs based on the measurement report. The UE 115 and base station 105 may then resume operation using the updated states 710 with the replaced/modified BPLs.

In some aspects, the UE 115 and base station 105 may use communications techniques that enable repeated transmissions during certain states 710 experiencing decreased link quality. In such cases, the configuration may indicate a communications mode that enables repeated transmissions for one or more states. Additionally or alternatively, in the updated states and BPLs signaled to the UE 115, the base station 105 may specify a number of repeated transmissions and corresponding BPLs per repeated transmissions for one or more states. The base station 105 may also signal a number of repeated simultaneous transmissions and corresponding BPLs per simultaneous transmission when in a state 710. For example, when signaling a configuration for the BPLs used for different states 710, a base station 105 may signal that the UE 115 transmit and receive repetitions of a packet in a state 710 determined to have degraded link quality. The repeated transmissions may include sending repetitions of the packet with a same BPL, or with different BPLs. Additionally or alternatively, a same packet may be simultaneously transmitted and received using multiple BPLs while in a state 710. For instance, the packet may be transmitted by multiple base station 105 and received by beams on respective panels (e.g., antenna arrays) of the UE 115. In other cases, a base station 105 may use multiple BPLs to simultaneously transmit a repeated packet to the UE 115 in a state 710, and the UE 115 may likewise receive the packet using multiple panels (and multiple BPLs). In some examples, the repeated transmissions may be transmitted to or received from different wireless devices. For instance, the UE 115 may be signaled to transmit repeated transmissions to multiple TRPs (e.g., using respective BPLs for each TRP) to ensure transmitted packet is received. The use of the repeated transmissions may enable robust communications during particular states 710 subject to interference.

In some examples, the base station 105 may signal the UE 115 to remove one or more states 710 (and corresponding movements of the predetermined movements 705) from operation. For example, based on the BPLs experiencing decreased link quality in a particular state 710, the base station 105 may determine to remove that state 710 from the operation of the UE 115. Further, after one or more states 710 are reconfigured or reprogrammed with updated BPLs, the base station 105 may signal the UE 115 to resume operation by starting from a beginning state or any state within a movement sequence (e.g., within the predetermined movements 705).

The described techniques may enable improved communications by updating at least one BPL for states 710 that may be affected by interference. Further, the described techniques may be performed dynamically as the communications environment between the UE 115 and base station 105 changes, allowing multiple updates to the BPLs and the states used by the UE 115.

Figure 8:
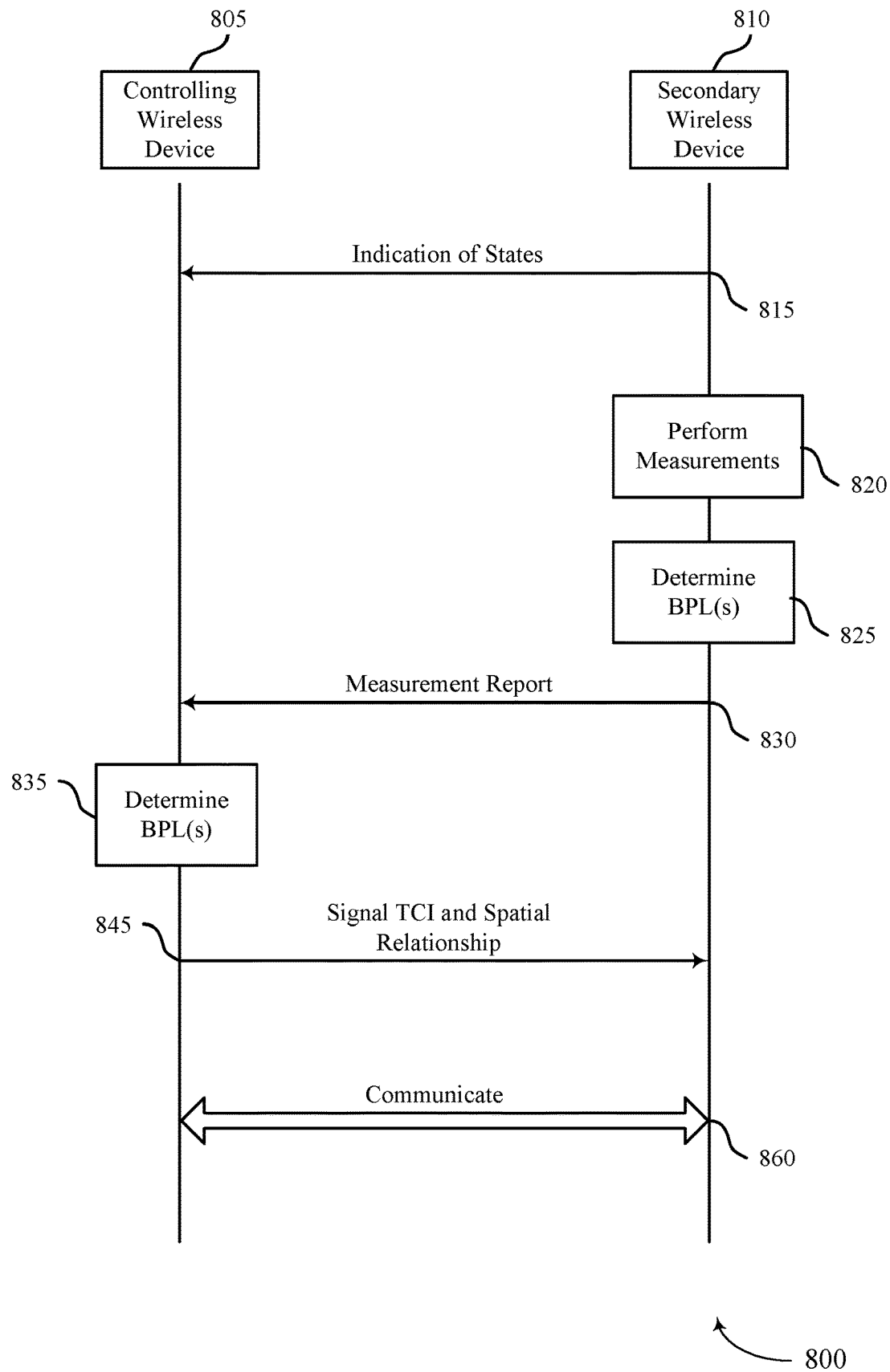
FIGS. 8 and 9 illustrate examples of process flows in a system that supports state-based beam switching in accordance with aspects of the present disclosure.

FIG. 8 illustrates an example of a process flow 800 that supports state-based beam switching in accordance with aspects of the present disclosure. In some examples, process flow 800 may implement aspects of wireless communications system 100. For instance, process flow 800 includes a controlling wireless device 805, which may be an example of a base station 105, a TRP, or a UE 115, as described with reference to FIGS. 1 and 2. Additionally, process flow 800 includes a secondary wireless device 810, which may be an example of a UE 115 or another device that is controlled by, for example, a controlling wireless device 805. Process flow 800 may illustrate training performed to identify BPLs for respective states of the secondary wireless device 810.

At 815, the secondary wireless device 810 may transmit, and the controlling wireless device 805 may receive, an indication of a set of states of the secondary wireless device 810. In some cases, each state of the set of states may corresponding to at least one of a position or orientation of the secondary wireless device 810. In some cases, the set of states may be identified by motion control procedures.

At 820, the secondary wireless device may perform a set of measurements for each state of the set of states. For instance, the secondary wireless device 810 may dwell in respective states of the set, and may perform measurements, for example, on transmit beams identified during a beam sweep. After measuring one state, the secondary wireless device 810 may transition to another state and perform the measurements for the other state.

At 825, the secondary wireless device 810 may determine, based on the set of states, a set of BPLs for communicating with the controlling wireless device 805 in the set of states, where each BPL of the set of BPLs corresponds to a respective state. In some examples, the determination may be based on the measurements performed while in each state of the set of states.

At 830, the secondary wireless device 810 may transmit, to the controlling wireless device 805, a measurement report including an indication of each BPL corresponding to the respective state of the set of states, where the indicated BPL may have a link quality that satisfies a threshold.

At 835, the controlling wireless device 805 may determine, based on the set of states of the secondary wireless device 810, the set of BPLs for communicating with the secondary wireless device 810 in the set of states. In some cases, the determination may be based on the received measurement report from the secondary wireless device 810.

In some cases, based on the set of determined BPLs, the controlling wireless device 805 may identify a set of transmit beams and receive beams having a link quality that satisfies a threshold. In some examples, the respective transmit beams and receive beams of the set of transmit beams and receive beams are for communicating at least one of a CORESET, PDSCH, a PUCCH, or an SRS. Further, at 845, the controlling wireless device 805 may transmit, to the secondary wireless device 810, an indication of a TCI state for at least one of the CORESET or the PDSCH for a corresponding state, as well as an indication of a spatial relationship for at least one of the PUCCH or the SRS for the corresponding state. Based on the received indications, the secondary wireless device may record the corresponding transmit and receive beams. In some cases, each state of the set of states uses one or more BPLs for simultaneous transmissions.

Based on the identified BPL(s) for each state, the controlling wireless device 805 and the secondary wireless device 810 may communicate by cycling through the set of BPLs by selecting a BPL corresponding to the respective state of the secondary wireless device 810. Because each device may be aware of the corresponding BPL for each state, additional retraining for different movements of the secondary wireless device 810 may not be needed during ongoing communications.

Figure 9:
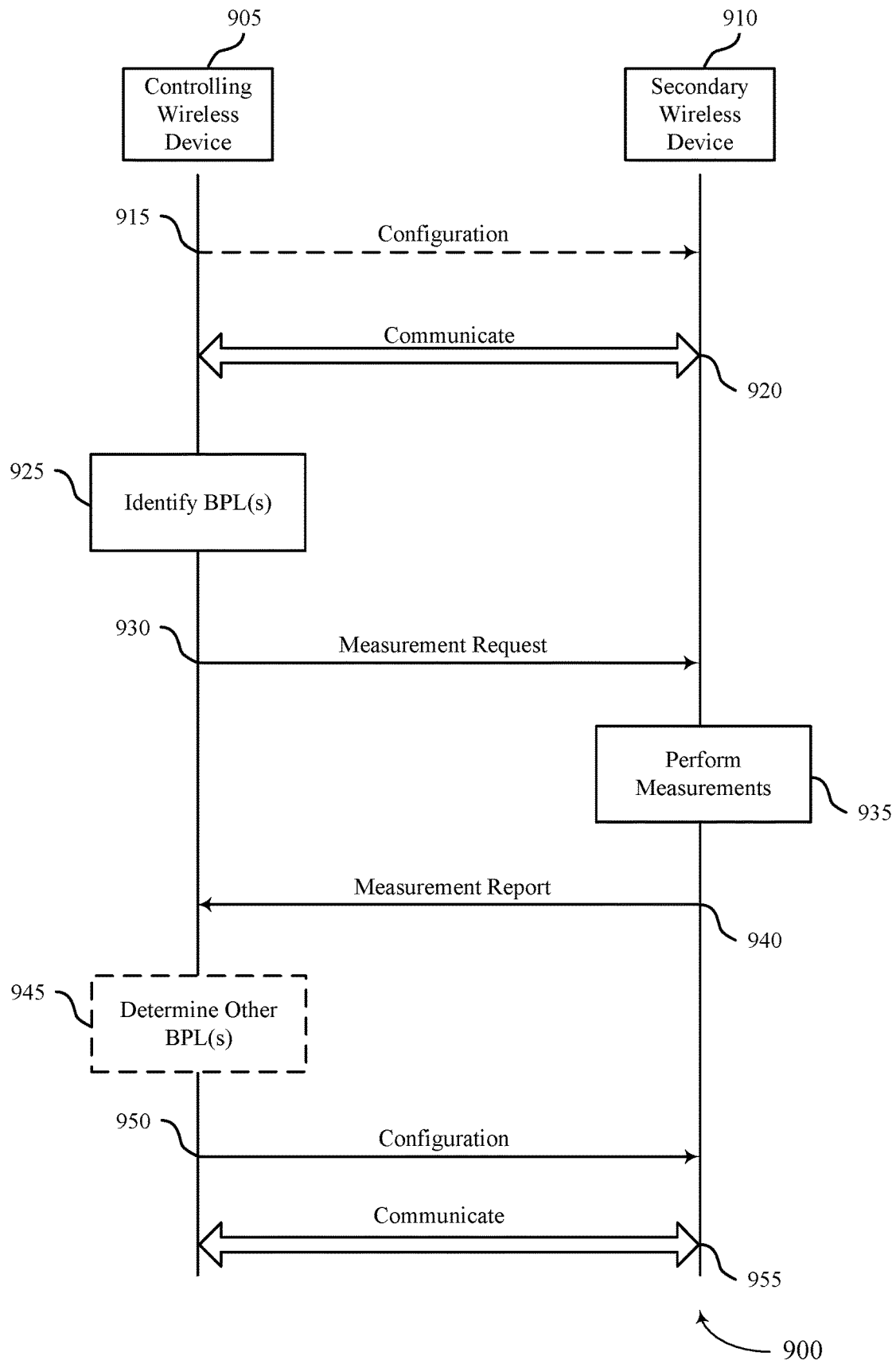

FIG. 9 illustrates an example of a process flow 900 that supports state-based beam switching in accordance with aspects of the present disclosure. In some examples, process flow 900 may implement aspects of wireless communications system 100. For instance, process flow 900 includes a controlling wireless device 805, which may be an example of a base station 105, a TRP, or a UE 115, as described with reference to FIGS. 1 and 2. Additionally, process flow 800 includes a secondary wireless device 910, which may be an example of a UE 115 or another device that is controlled by, for example, a controlling wireless device 905. Process flow 900 may illustrate the use of modified communications schemes through the adjustment of state-based BPLs used by each device in the presence of interference.

At 915, the controlling wireless device 905 may transmit, and the secondary wireless device 910 may receive, a configuration of a series of movements for the secondary wireless device 910. The series of movements may include using a set of states and corresponding BPLs that are used to transmit and receive data at respective times of the series of movements. In some cases, the configuration may be signaled using RRC signaling, using a MAC-CE, or other types of signaling supported by the wireless devices. In some cases, the configuration may be based on a previously-completed beam training (and measurements) for states of the secondary wireless device 910 (e.g., as described with reference to FIG. 8).

At 920, the controlling wireless device 905 and the secondary wireless device 910 may communicate by cycling through the set of BPLs by selecting a BPL corresponding to the respective state of the secondary wireless device 910. In such cases, each BPL of the set of BPLs may correspond to a different locations or orientation of the secondary wireless device 910 as it progresses through the series of movements.

At 925, the controlling wireless device 905 may identify, for at least one state of the set of states, at least one BPL of the set of BPLs having a link quality that does not satisfy a threshold. As an example, the controlling wireless device 905 may detect that a link quality for a BPL has decreased from a previously recorded value (e.g., by a certain quantity) for a state. In other cases, the controlling wireless device 905 may identify a number of retransmissions requested by the secondary wireless device 910 (e.g., using HARQ feedback) in a state. In any event, the link quality of at least one BPL may trigger the controlling wireless device 905 to enable techniques that update BPLs for communication with the secondary wireless device 910.

At 930, the controlling wireless device 905 may transmit, and the secondary wireless device 910 may receive, a signal requesting the secondary wireless device perform measurements for at least one state. As such, at 935, the secondary wireless device 910 may perform measurements for BPLs for the identified state. In such cases, the secondary wireless device 910 may identify a best BPL (e.g., a BPL having a highest signal quality with relation to other possible BPLs). At 940, the secondary wireless device 910 may transmit a measurement report to the controlling wireless device 905. In some cases, the measurement report may include an indication of the BPL identified by the secondary wireless device 910 for the at least one state.

At 945, the controlling wireless device 905 may determine, based on the at least one BPL having the link quality that does not satisfy the threshold at least one other BPL having a link quality that satisfies the threshold. In some cases, the at least one other BPL for the state may be based at least in part on the received measurement report.

At 950, the controlling wireless device 905 may transmit, and the secondary wireless device 910 may receive, a configuration that modifies communications with the secondary wireless device 910 for the at least one state of the set of states. In some examples, the configuration that modifies the communications with the secondary wireless device 910 replaces the at least one BPL with the at least one other BPL for the at least one state. In such cases, at 955, the controlling wireless device 905 and the secondary wireless device 910 may communicate during a subsequent instance of the communication time period by cycling through the set of BPLs including the at least one other BPL by selecting the BPL corresponding to the respective state of the secondary wireless device 910.

Additionally or alternatively, the configuration that modifies the communications with the secondary wireless device 910 may enable repeated transmissions by the devices. In such cases, the controlling wireless device 905 may determine, based on the at least one BPL having the link quality that does not satisfy the threshold, to use repeated transmissions for at least one state of the set of states. Accordingly, the controlling wireless device 905 may determine at least one of a number of the repeated transmissions, a corresponding BPL for each repeated transmission, or corresponding BPLs for simultaneous transmissions, where the repeated transmissions may include repetitions of a packet using a same BPL, or repetitions of the packet using two or more different BPLs, or simultaneous repetitions of a packet using two or more BPLs, or a combination thereof.

In other examples, the configuration that modifies the communications with the secondary wireless device 910 includes an adjusted set of states that excludes the at least one state. That is, at 955, the controlling wireless device 905 and the secondary wireless device 910 may communicate during a subsequent communication time period without the at least one state that is affected by decreased link quality. In some cases, the communications at 955 may be triggered by a signal from the controlling wireless device 905, or may be resumed autonomously. In some examples, the operations of process flow 900 may be performed repeatedly, where the controlling wireless device 905 may continually monitor for BPLs having a decreased link quality, and update the BPLs used for communications through any of the described techniques.

Figure 10:
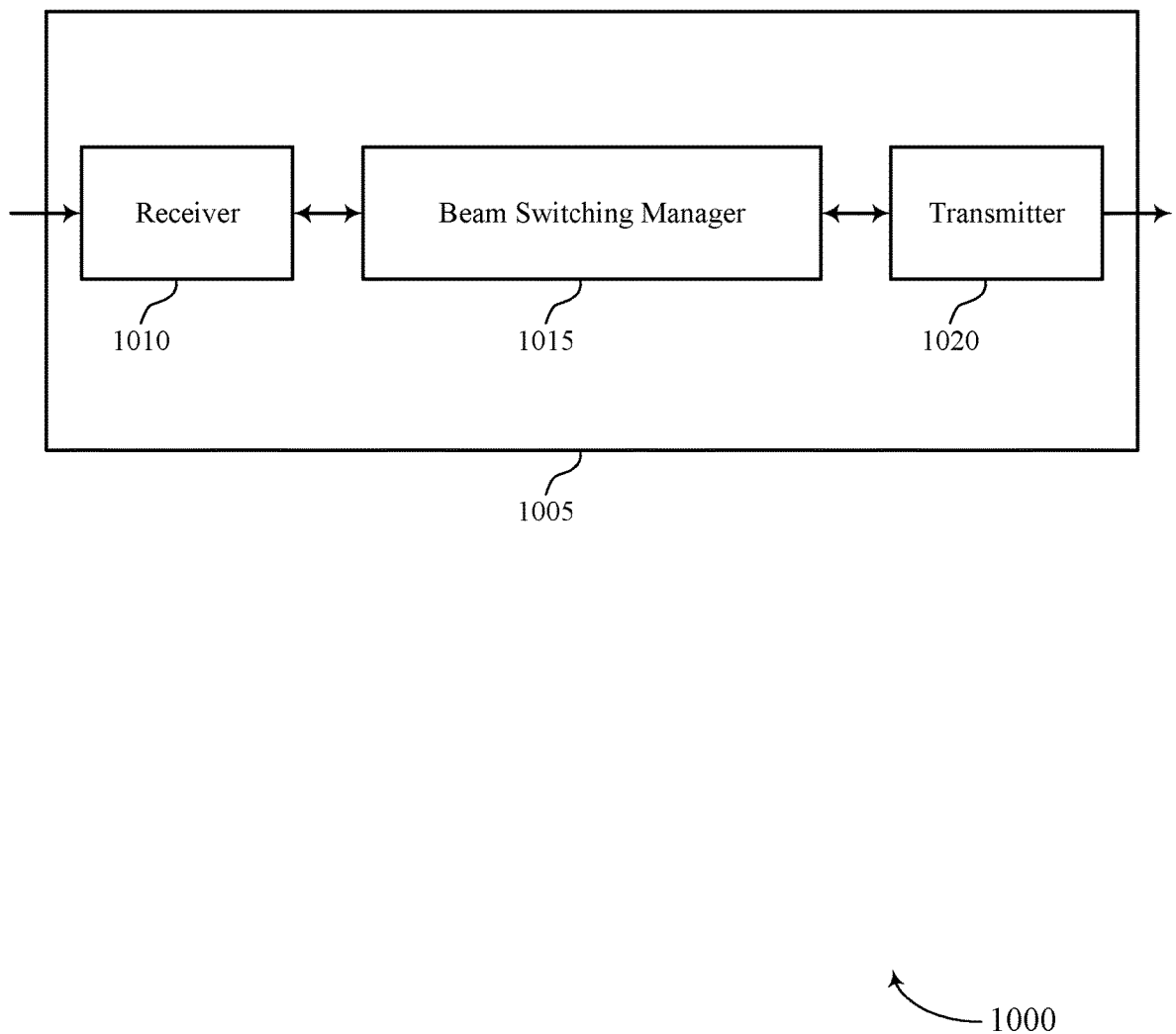
FIGS. 10 and 11 show block diagrams of devices that support state-based beam switching in accordance with aspects of the present disclosure.

FIG. 10 shows a block diagram 1000 of a device 1005 that supports state-based beam switching in accordance with aspects of the present disclosure. The device 1005 may be an example of aspects of a UE 115, base station 105, controlling wireless device, secondary wireless device, or TRP as described herein. The device 1005 may include a receiver 1010, a beam switching manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to state-based beam switching, etc.). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The beam switching manager 1015 may receive an indication of a set of states of a secondary wireless device, each state of the set of states corresponding to at least one of a position or orientation of the secondary wireless device, determine, based on the set of states of the secondary wireless device, a set of BPLs for communicating with the secondary wireless device in the set of states, each BPL of the set of BPLs corresponding to a respective state of the set of states, and communicate with the secondary wireless device based on the set of BPLs and the set of states.

In some examples, the beam switching manager 1015 may also transmit, to a controlling wireless device, an indication of a set of states of the secondary wireless device, each state of the set of states corresponding to at least one of a position or orientation of the secondary wireless device, determine, based on the set of states of the secondary wireless device, a set of BPLs for communicating with the controlling wireless device in the set of states, each BPL of the set of BPLs corresponding to a respective state of the set of states, and communicate with the controlling wireless device based on the set of BPLs and the set of states. The beam switching manager 1015 may be an example of aspects of the beam switching manager 1310 or 1410 as described herein.

The beam switching manager 1015, or its sub-components, may be implemented in hardware, code (e.g., software or firmware) executed by a processor, or any combination thereof. If implemented in code executed by a processor, the functions of the beam switching manager 1015, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The beam switching manager 1015, or its sub-components, may be physically located at various positions, including being distributed such that portions of functions are implemented at different physical locations by one or more physical components. In some examples, the beam switching manager 1015, or its sub-components, may be a separate and distinct component in accordance with various aspects of the present disclosure. In some examples, the beam switching manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 or 1420 as described with reference to FIGS. 13 and 14. The transmitter 1020 may utilize a single antenna or a set of antennas.

In some examples, the beam switching manager 1015 may be implemented as an integrated circuit or chipset for a mobile device modem, and the receiver 1010 and transmitter 1020 may be implemented as analog components (e.g., amplifiers, filters, antennas) coupled with the mobile device modem to enable wireless transmission and reception over one or more bands.

The beam switching manager 1015 as described herein may be implemented to realize one or more potential advantages. One implementation may allow device 1005 to determine link quality of a BPL to a base station based upon the state of device 1005, and in some cases, establish a new BPL through training of the communication between device 1005 and the base station. The new trained BPL may increase the communication efficiency between device 1005 and the base station, which may promote network efficiencies and device efficiencies, among other benefits.

Figure 11:
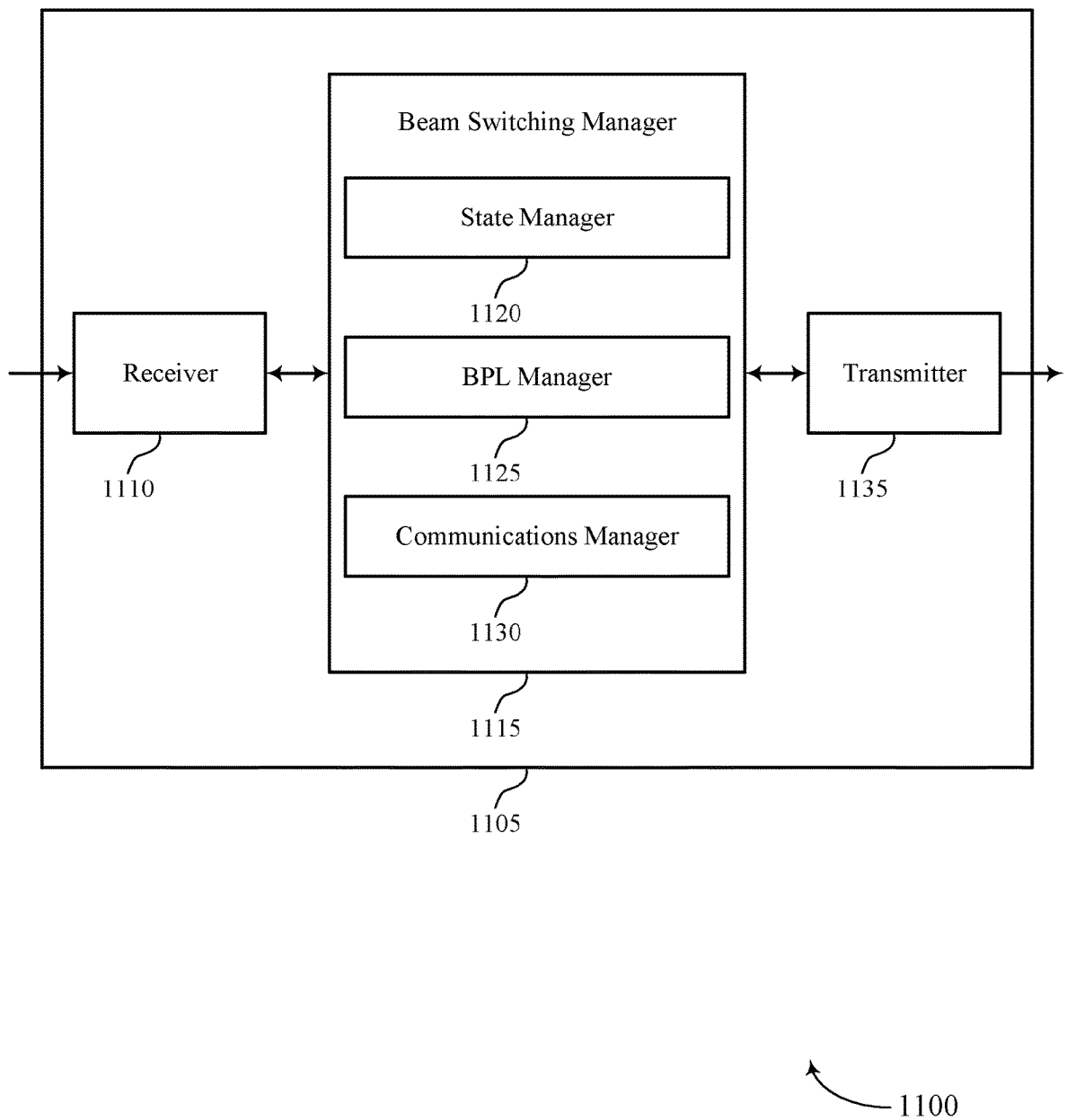

FIG. 11 shows a block diagram 1100 of a device 1105 that supports state-based beam switching in accordance with aspects of the present disclosure. The device 1105 may be an example of aspects of a device 1005, a UE 115, a base station 105, a controlling wireless device, a secondary wireless device, or a TRP as described herein. The device 1105 may include a receiver 1110, a beam switching manager 1115, and a transmitter 1135. The device 1105 may also include a processor. Each of these components may be in communication with one another (e.g., via one or more buses).

Receiver 1110 may receive information such as packets, user data, or control information associated with various information channels (e.g., control channels, data channels, and information related to state-based beam switching, etc.). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The beam switching manager 1115 may be an example of aspects of the beam switching manager 1015 as described herein. The beam switching manager 1115 may include a state manager 1120, a BPL manager 1125, and a communications manager 1130. The beam switching manager 1115 may be an example of aspects of the beam switching manager 1310 or 1410 as described herein.

The state manager 1120 may receive an indication of a set of states of a secondary wireless device, each state of the set of states corresponding to at least one of a position or orientation of the secondary wireless device. In some cases, the state manager 1120 may transmit, to a controlling wireless device, an indication of a set of states of the secondary wireless device, each state of the set of states corresponding to at least one of a position or orientation of the secondary wireless device.

The BPL manager 1125 may determine, based on the set of states of the secondary wireless device, a set of BPLs for communicating with the secondary wireless device in the set of states, each BPL of the set of BPLs corresponding to a respective state of the set of states. Additionally or alternatively, the BPL manager 1125 may determine, based on the set of states of the secondary wireless device, a set of BPLs for communicating with the controlling wireless device in the set of states, each BPL of the set of BPLs corresponding to a respective state of the set of states.

The communications manager 1130 may communicate with the secondary wireless device based on the set of BPLs and the set of states. In some examples, the communications manager 1130 may communicate with the controlling wireless device based on the set of BPLs and the set of states.

Transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 or 1420 as described with reference to FIGS. 13 and 14. The transmitter 1135 may utilize a single antenna or a set of antennas.

Figure 12:
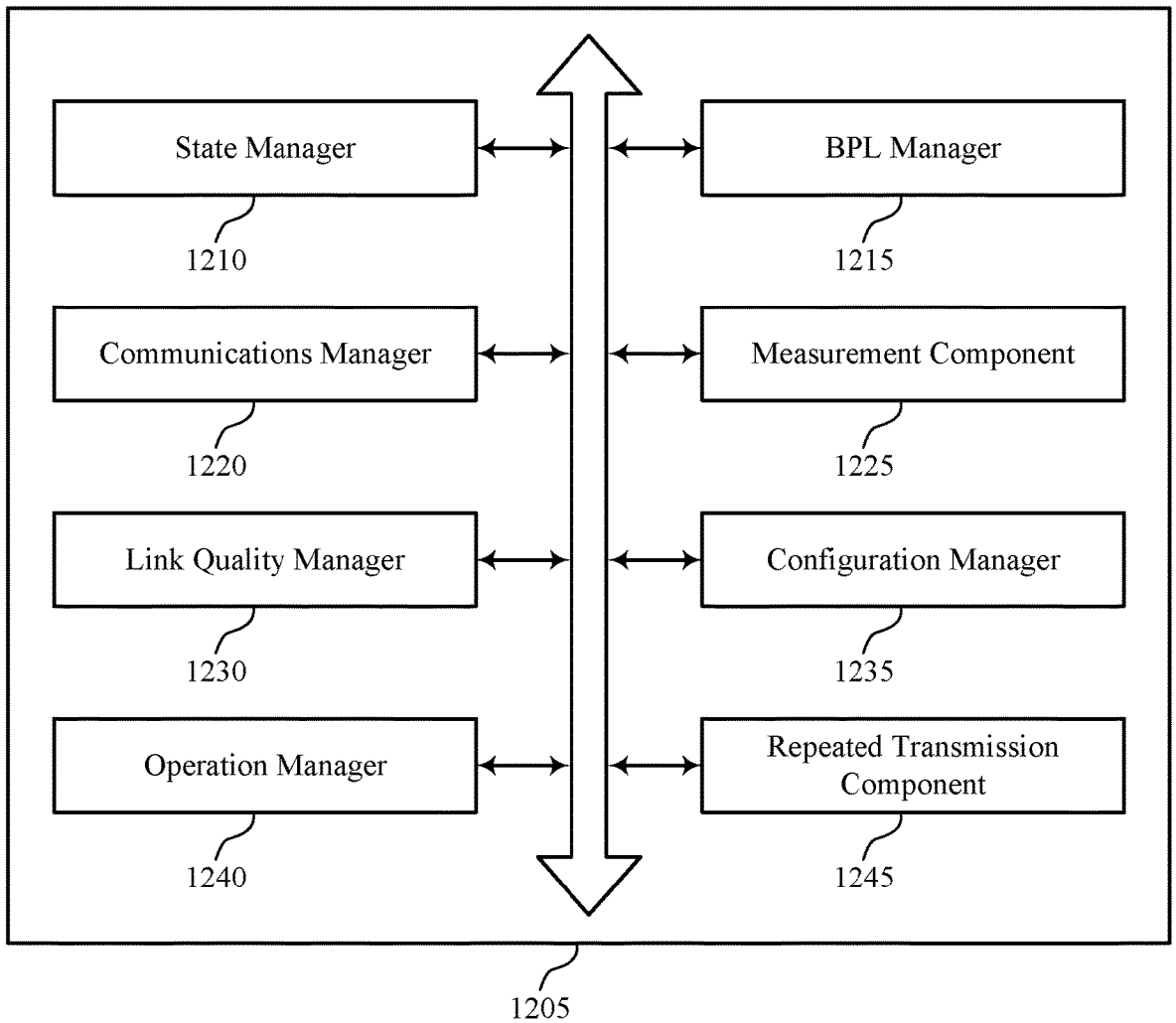
FIG. 12 shows a block diagram of a beam switching manager that supports state-based beam switching in accordance with aspects of the present disclosure.

FIG. 12 shows a block diagram 1200 of a beam switching manager 1205 that supports state-based beam switching in accordance with aspects of the present disclosure. The beam switching manager 1205 may be an example of aspects of a beam switching manager 1015, a beam switching manager 1115, or a beam switching manager 1310 described herein. The beam switching manager 1205 may include a state manager 1210, a BPL manager 1215, a communications manager 1220, a measurement component 1225, a link quality manager 1230, a configuration manager 1235, an operation manager 1240, and a repeated transmission component 1245. Each of these modules may communicate, directly or indirectly, with one another (e.g., via one or more buses).

The state manager 1210 may receive an indication of a set of states of a secondary wireless device, each state of the set of states corresponding to at least one of a position or orientation of the secondary wireless device. In some examples, the state manager 1210 may transmit, to a controlling wireless device, an indication of a set of states of the secondary wireless device, each state of the set of states corresponding to at least one of a position or orientation of the secondary wireless device.

In some examples, the state manager 1210 may transmit, to the secondary wireless device, an indication of a TCI state for at least one of the CORESET or the PDSCH for a corresponding state. In some examples, the state manager 1210 may transmit, to the secondary wireless device, an indication of a spatial relationship for at least one of the PUCCH or the SRS for a corresponding state.

In some examples, the state manager 1210 may receive, from the controlling wireless device, an indication of a TCI state for at least one of the CORESET or the PDSCH for a corresponding state. In some examples, the state manager 1210 may receive, from the controlling wireless device, an indication of a spatial relationship for at least one of the PUCCH or the SRS for a corresponding state.

The BPL manager 1215 may determine, based on the set of states of the secondary wireless device, a set of BPLs for communicating with the secondary wireless device in the set of states, each BPL of the set of BPLs corresponding to a respective state of the set of states. In some examples, the BPL manager 1215 may determine, based on the set of states of the secondary wireless device, a set of BPLs for communicating with the controlling wireless device in the set of states, each BPL of the set of BPLs corresponding to a respective state of the set of states.

In some examples, the BPL manager 1215 may determine, based on the at least one BPL having the link quality that does not satisfy the threshold, at least one other BPL having a link quality that satisfies the threshold. In some examples, the BPL manager 1215 may identify transmit beams and receive beams corresponding to at least one of the CORESET or the PDSCH based on the received indication. In some examples, the BPL manager 1215 may identify transmit beams and receive beams corresponding to at least one of the PUCCH or the SRS based on the received indication. In some cases, each state of the set of states utilizes one or more BPLs for simultaneous transmissions. In some cases, each state of the set of states utilizes one or more BPLs for simultaneous transmissions.

The communications manager 1220 may communicate with the secondary wireless device based on the set of BPLs and the set of states. In some examples, the communications manager 1220 may communicate with the controlling wireless device based on the set of BPLs and the set of states. In some examples, the communications manager 1220 may communicate with the secondary wireless device by cycling through the set of BPLs by selecting a BPL corresponding to the respective state of the secondary wireless device. In some examples, the communications manager 1220 may communicate, based on the configuration, with the secondary wireless device by cycling through the set of BPLs including the at least one other BPL by selecting the BPL corresponding to the respective state of the secondary wireless device.

In some examples, the communications manager 1220 may communicate with the secondary wireless device by cycling through the set of BPLs by selecting a BPL corresponding to the respective state in accordance with the order of the set of states. In some examples, the communications manager 1220 may communicate with the controlling wireless device by cycling through the set of BPLs by selecting a BPL corresponding to the respective state of the secondary wireless device. In some examples, the communications manager 1220 may communicate, based on the configuration, with the controlling wireless device by cycling through the set of BPLs including the at least one other BPL by selecting the BPL corresponding to the respective state of the secondary wireless device. In some examples, the communications manager 1220 may communicate with the controlling wireless device by cycling through the set of BPLs by selecting a BPL corresponding to the respective state in accordance with the order of the set of states.

The measurement component 1225 may receive, from the secondary wireless device, a measurement report including an indication of each BPL corresponding to the respective state of the set of states, where determining the set of BPLs is based on the received measurement report. In some examples, the measurement component 1225 may transmit a signal requesting the secondary wireless device perform measurements for the at least one state. In some examples, the measurement component 1225 may receive, from the secondary wireless device and in response to the signal, a measurement report for the at least one state, where determining the at least one other BPL is based on the received measurement report.

In some examples, the measurement component 1225 may perform a set of measurements for each state of the set of states. In some examples, the measurement component 1225 may transmit, to the controlling wireless device, a measurement report including an indication of each BPL corresponding to the respective state of the set of states, where determining the set of BPLs is based on the set of measurements. In some examples, the measurement component 1225 may receive a signal requesting the secondary wireless device perform measurements for the at least one state. In some examples, the measurement component 1225 may perform a set of measurements for the at least one state. In some examples, the measurement component 1225 may transmit, to the controlling wireless device and in response to the signal, a measurement report for the at least one state, where the at least one other BPL is based on the set of measurements.

The link quality manager 1230 may identify a set of transmit beams and receive beams having a link quality that satisfies a threshold, where respective transmit beams and receive beams of the set of transmit beams and receive beams are for communicating at least one of a CORESET, PDSCH, a PUCCH, or a SRS. In some examples, the link quality manager 1230 may identify, for at least one state of the set of states, at least one BPL of the set of BPLs having a link quality that does not satisfy a threshold. In some examples, the link quality manager 1230 may determine, based on at least one BPL having a link quality that does not satisfy a threshold, to utilize repeated transmissions for at least one state of the set of states.

In some examples, the link quality manager 1230 may identify a set of transmit beams and receive beams having a link quality that satisfies a threshold, where respective transmit beams and receive beams of the set of transmit beams and receive beams are for communicating at least one of a CORESET, PDSCH, a PUCCH, or a SRS. The configuration manager 1235 may transmit, to the secondary wireless device, a configuration that modifies communications with the secondary wireless device for the at least one state of the set of states.

In some examples, the configuration that modifies the communications with the secondary wireless device may replace the at least one BPL with the at least one other BPL for the at least one state. In some examples, the configuration manager 1235 may transmit, to the secondary wireless device, a configuration that modifies communications with the secondary wireless device for the at least one state of the set of states, where the configuration enables the repeated transmissions. In some examples, the configuration that modifies the communications with the secondary wireless device may include an indication of at least one of the number of the repeated transmissions, the corresponding BPL for each repeated transmission, or the corresponding BPLs for the simultaneous transmissions.

In some examples, the configuration manager 1235 may transmit, to the secondary wireless device, a configuration that modifies communications with the secondary wireless device for the at least one state of the set of states, the configuration including an adjusted set of states that excludes the at least one state. In some examples, the configuration manager 1235 may transmit, to the secondary wireless device, a configuration of an order of the set of states. In some examples, the configuration manager 1235 may receive, from the controlling wireless device, a configuration that modifies communications with the controlling wireless device for at least one state of the set of states, the configuration received based on at least one BPL of the set of BPLs having a link quality that does not satisfy a threshold.

In some examples, the configuration manager 1235 may receive, from the controlling wireless device, a configuration that modifies communications with the controlling wireless device for at least one state of the set of states based on at least one BPL of the set of BPLs having a link quality that does not satisfy a threshold, the configuration including an adjusted set of states that excludes the at least one state. In some examples, the configuration manager 1235 may receive, from the controlling wireless device, a configuration of an order of the set of states. In some cases, the configuration that modifies the communications with the controlling wireless device replaces the at least one BPL with at least one other BPL having a link quality that satisfies the threshold for the at least one state.

The operation manager 1240 may transmit, to the secondary wireless device, an indication to resume operation in accordance with the set of states, where the operation is resumed from at least one of a beginning of the set of states or a designated state of the set of states. In some examples, the operation manager 1240 may receive, from the controlling wireless device, an indication to resume operation in accordance with the set of states, where the operation is resumed from at least one of a beginning of the set of states or a designated state of the set of states.

The repeated transmission component 1245 may determine at least one of a number of the repeated transmissions, a corresponding BPL for each repeated transmission, or corresponding BPLs for simultaneous transmissions. In some examples, the repeated transmission component 1245 may receive, from the controlling wireless device, a configuration that modifies communications with the controlling wireless device for at least one state of the set of states, where the configuration enables repeated transmissions based on at least one BPL of the set of BPLs having a link quality that does not satisfy a threshold. In some cases, the repeated transmissions include at least one of repetitions of a packet using a same BPL or repetitions of the packet using two or more different BPLs. In some cases, the repeated transmissions include simultaneous repetitions of a packet using two or more BPLs. In some cases, the configuration that modifies the communications with the controlling wireless device includes an indication of at least one of a number of repeated transmissions, a corresponding BPL for each repeated transmission, or a corresponding BPLs for simultaneous transmissions.

Figure 13:
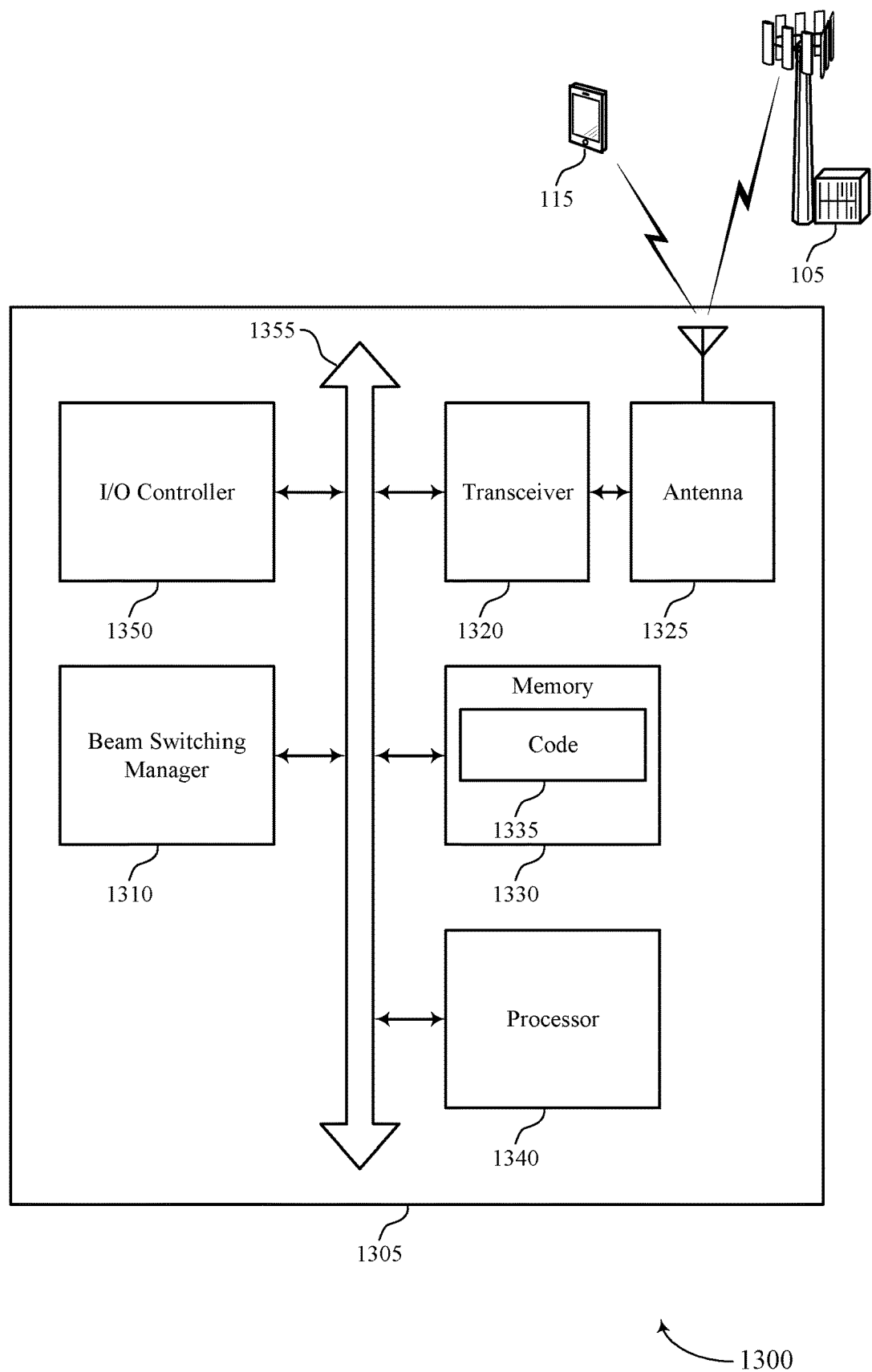
FIG. 13 shows a diagram of a system including a user equipment (UE) that supports state-based beam switching in accordance with aspects of the present disclosure.

FIG. 13 shows a diagram of a system 1300 including a device 1305 that supports state-based beam switching in accordance with aspects of the present disclosure. The device 1305 may be an example of or include the components of device 1005, device 1105, or a UE 115, a base station 105, a controlling wireless device, a secondary wireless device, or a TRP as described herein. The device 1305 may include components for bi-directional voice and data communications including components for transmitting and receiving communications, including a beam switching manager 1310, a transceiver 1320, an antenna 1325, memory 1330, a processor 1340, and an I/O controller 1350. These components may be in electronic communication via one or more buses (e.g., bus 1355).

The beam switching manager 1310 may receive an indication of a set of states of a secondary wireless device, each state of the set of states corresponding to at least one of a position or orientation of the secondary wireless device, determine, based on the set of states of the secondary wireless device, a set of BPLs for communicating with the secondary wireless device in the set of states, each BPL of the set of BPLs corresponding to a respective state of the set of states, and communicate with the secondary wireless device based on the set of BPLs and the set of states. The beam switching manager 1310 may also transmit, to a controlling wireless device, an indication of a set of states of the secondary wireless device, each state of the set of states corresponding to at least one of a position or orientation of the secondary wireless device, determine, based on the set of states of the secondary wireless device, a set of BPLs for communicating with the controlling wireless device in the set of states, each BPL of the set of BPLs corresponding to a respective state of the set of states, and communicate with the controlling wireless device based on the set of BPLs and the set of states.

Transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include random access memory (RAM), read-only memory (ROM), or a combination thereof. The memory 1330 may store computer-readable code 1335 including instructions that, when executed by a processor (e.g., the processor 1340) cause the device to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting state-based beam switching).

The I/O controller 1350 may manage input and output signals for the device 1305. The I/O controller 1350 may also manage peripherals not integrated into the device 1305. In some cases, the I/O controller 1350 may represent a physical connection or port to an external peripheral. In some cases, the I/O controller 1350 may utilize an operating system such as iOS®, ANDROID®, MS-DOS®, MS-WINDOWS®, OS/2®, UNIX®, LINUX®, or another known operating system. In other cases, the I/O controller 1350 may represent or interact with a modem, a keyboard, a mouse, a touchscreen, or a similar device. In some cases, the I/O controller 1350 may be implemented as part of a processor. In some cases, a user may interact with the device 1305 via the I/O controller 1350 or via hardware components controlled by the I/O controller 1350.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
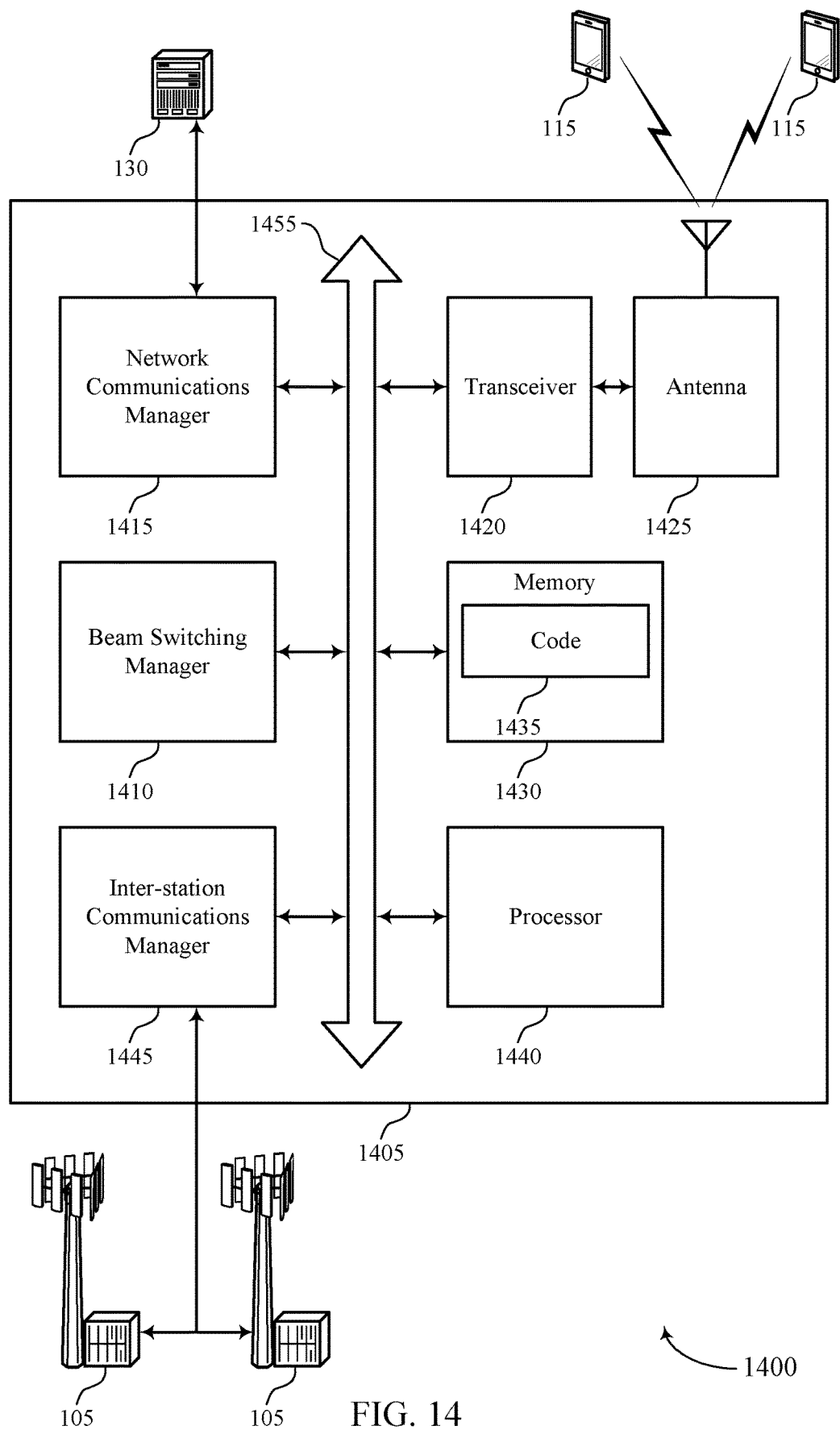
FIG. 14 shows a diagram of a system including a base station that supports state-based beam switching in accordance with aspects of the present disclosure.

FIG. 14 shows a diagram of a system 1400 including a device 1405 that supports state-based beam switching in accordance with aspects of the present disclosure. The device 1405 may be an example of or include the components of device 1005, device 1105, a UE 115, a base station 105, a controlling wireless device, a secondary wireless device, or a TRP as described herein. The device 1405 may include components for bi-directional voice and data communications including components for transmitting and receiving communications, including a beam switching manager 1410, a network communications manager 1415, a transceiver 1420, an antenna 1425, memory 1430, a processor 1440, and an inter-station communications manager 1445. These components may be in electronic communication via one or more buses (e.g., bus 1455).

The beam switching manager 1410 may receive an indication of a set of states of a secondary wireless device, each state of the set of states corresponding to at least one of a position or orientation of the secondary wireless device, determine, based on the set of states of the secondary wireless device, a set of BPLs for communicating with the secondary wireless device in the set of states, each BPL of the set of BPLs corresponding to a respective state of the set of states, and communicate with the secondary wireless device based on the set of BPLs and the set of states. The beam switching manager 1410 may also transmit, to a controlling wireless device, an indication of a set of states of the secondary wireless device, each state of the set of states corresponding to at least one of a position or orientation of the secondary wireless device, determine, based on the set of states of the secondary wireless device, a set of BPLs for communicating with the controlling wireless device in the set of states, each BPL of the set of BPLs corresponding to a respective state of the set of states, and communicate with the controlling wireless device based on the set of BPLs and the set of states.

Network communications manager 1415 may manage communications with the core network (e.g., via one or more wired backhaul links). For example, the network communications manager 1415 may manage the transfer of data communications for client devices, such as one or more UEs 115.

Transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting state-based beam switching).

Inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
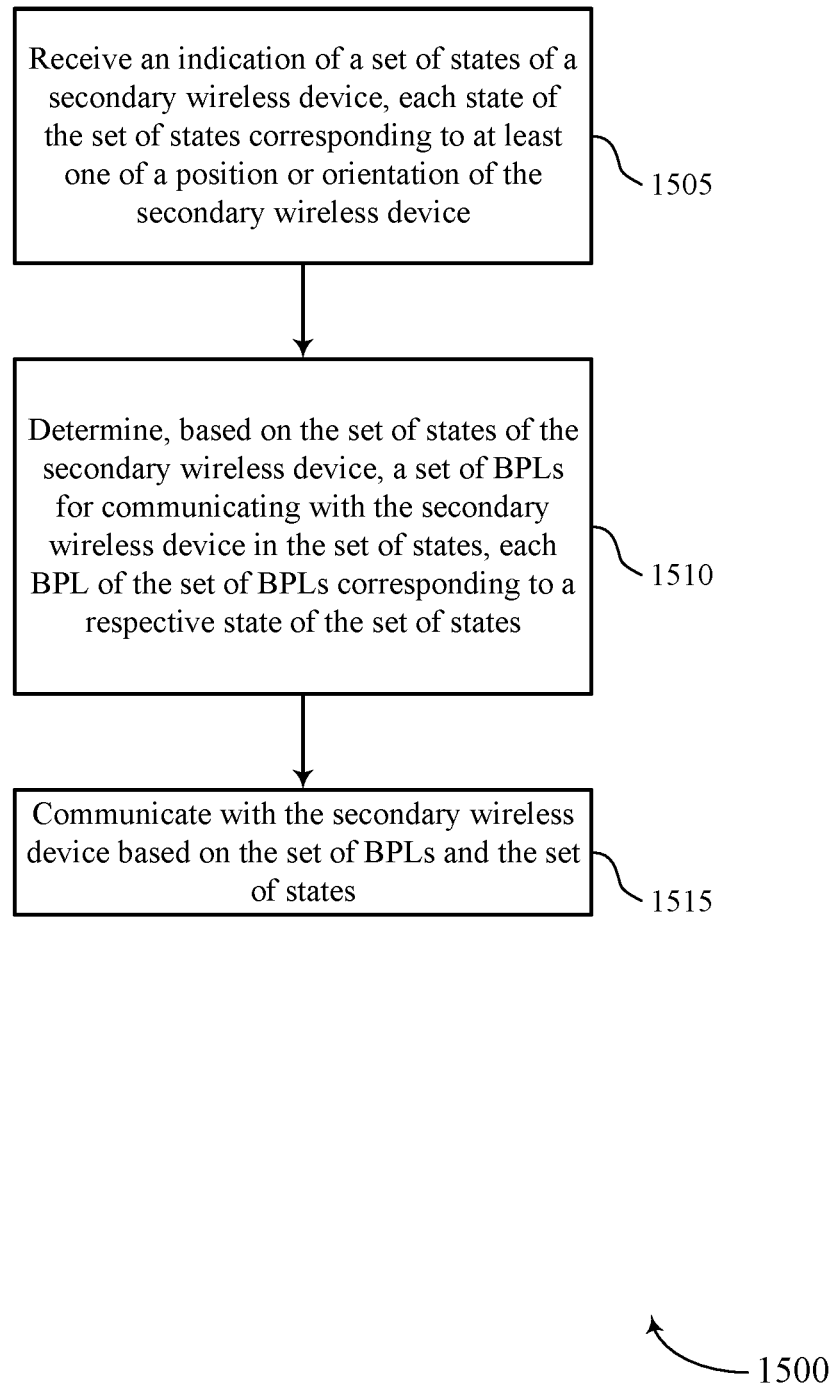
FIGS. 15 and 16 show flowcharts illustrating methods that support state-based beam switching in accordance with aspects of the present disclosure.

FIG. 15 shows a flowchart illustrating a method 1500 that supports state-based beam switching in accordance with aspects of the present disclosure. The operations of method 1500 may be implemented by a controlling wireless device (such as a UE 115, TRP, or base station 105) or its components as described herein. For example, the operations of method 1500 may be performed by a beam switching manager as described with reference to FIGS. 10 through 14. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the controlling wireless device may receive an indication of a set of states of a secondary wireless device, each state of the set of states corresponding to at least one of a position or orientation of the secondary wireless device. The operations of 1505 may be performed according to the methods described herein. In some examples, aspects of the operations of 1505 may be performed by a state manager as described with reference to FIGS. 10 through 14.

At 1510, the controlling wireless device may determine, based on the set of states of the secondary wireless device, a set of BPLs for communicating with the secondary wireless device in the set of states, each BPL of the set of BPLs corresponding to a respective state of the set of states. The operations of 1510 may be performed according to the methods described herein. In some examples, aspects of the operations of 1510 may be performed by a BPL manager as described with reference to FIGS. 10 through 14.

At 1515, the controlling wireless device may communicate with the secondary wireless device based on the set of BPLs and the set of states. The operations of 1515 may be performed according to the methods described herein. In some examples, aspects of the operations of 1515 may be performed by a communications manager as described with reference to FIGS. 10 through 14.

Figure 16:
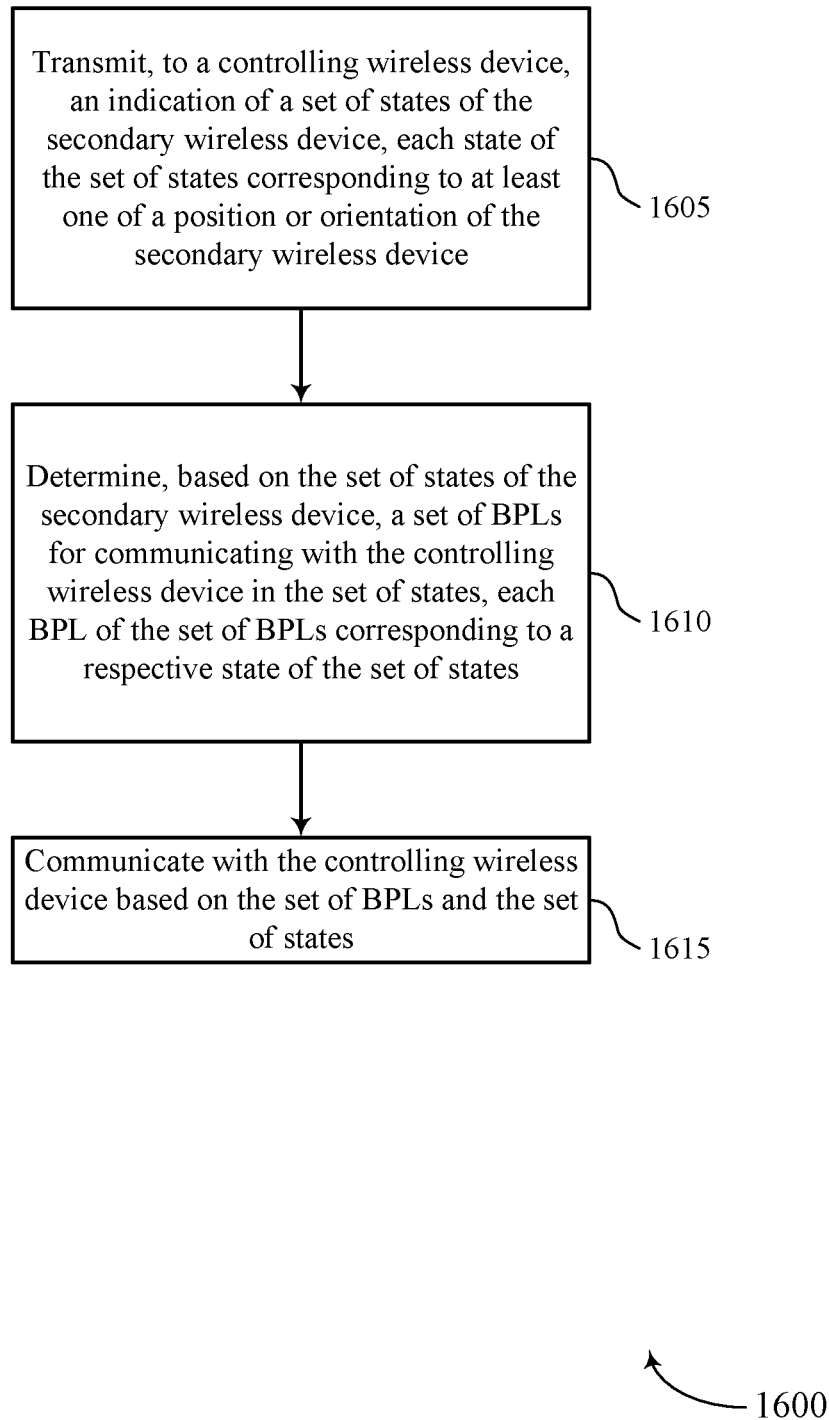

FIG. 16 shows a flowchart illustrating a method 1600 that supports state-based beam switching in accordance with aspects of the present disclosure. The operations of method 1600 may be implemented by a secondary wireless device (such as a UE 115 or base station 105) or its components as described herein. For example, the operations of method 1600 may be performed by a beam switching manager as described with reference to FIGS. 10 through 14. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the secondary wireless device may transmit, to a controlling wireless device, an indication of a set of states of the secondary wireless device, each state of the set of states corresponding to at least one of a position or orientation of the secondary wireless device. The operations of 1605 may be performed according to the methods described herein. In some examples, aspects of the operations of 1605 may be performed by a state manager as described with reference to FIGS. 10 through 14.

At 1610, the secondary wireless device may determine, based on the set of states of the secondary wireless device, a set of BPLs for communicating with the controlling wireless device in the set of states, each BPL of the set of BPLs corresponding to a respective state of the set of states. The operations of 1610 may be performed according to the methods described herein. In some examples, aspects of the operations of 1610 may be performed by a BPL manager as described with reference to FIGS. 10 through 14.

At 1615, the secondary wireless device may communicate with the controlling wireless device based on the set of BPLs and the set of states. The operations of 1615 may be performed according to the methods described herein. In some examples, aspects of the operations of 1615 may be performed by a communications manager as described with reference to FIGS. 10 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal FDMA (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a controlling wireless device, comprising:
   receiving an indication of a plurality of states of a secondary wireless device, each state of the plurality of states corresponding to at least one of a position or orientation of the secondary wireless device, the position or orientation being predetermined;
   determining, based at least in part on the plurality of states of the secondary wireless device, a plurality of beam pair links (BPLs) for communicating with the secondary wireless device in the plurality of states, each BPL of the plurality of BPLs corresponding to a respective state of the plurality of states; and
   communicating with the secondary wireless device based at least in part on the plurality of BPLs and the plurality of states.

2. The method of claim 1, further comprising:
   communicating with the secondary wireless device by cycling through the plurality of BPLs by selecting a BPL corresponding to the respective state of the secondary wireless device.

3. The method of claim 1, further comprising:
   receiving, from the secondary wireless device, a measurement report comprising an indication of the each BPL corresponding to the respective state of the plurality of states, wherein determining the plurality of BPLs is based at least in part on the received measurement report.

4. The method of claim 1, wherein determining the plurality of BPLs comprises:
   identifying a plurality of transmit beams and receive beams having a link quality that satisfies a threshold, wherein respective transmit beams and receive beams of the plurality of transmit beams and receive beams are for communicating at least one of a control resource set (CORESET), physical downlink shared channel (PDSCH), a physical uplink control channel (PUCCH), or a sounding reference signal (SRS).

5. The method of claim 4, further comprising:
   transmitting, to the secondary wireless device, an indication of a transmission configuration indicator (TCI) state for at least one of the CORESET or the PDSCH for a corresponding state.

6. The method of claim 4, further comprising:
   transmitting, to the secondary wireless device, an indication of a spatial relationship for at least one of the PUCCH or the SRS for a corresponding state.

7. The method of claim 1, wherein each state of the plurality of states utilizes one or more BPLs for simultaneous transmissions.

8. The method of claim 1, further comprising:
   identifying, for at least one state of the plurality of states, at least one BPL of the plurality of BPLs having a link quality that does not satisfy a threshold; and
   transmitting, to the secondary wireless device, a configuration that modifies communications with the secondary wireless device for the at least one state of the plurality of states.

9. The method of claim 8, further comprising:
   determining, based at least in part on the at least one BPL having the link quality that does not satisfy the threshold, at least one other BPL having a link quality that satisfies the threshold,
   wherein the configuration that modifies the communications with the secondary wireless device replaces the at least one BPL with the at least one other BPL for the at least one state.

10. The method of claim 9, further comprising:
    transmitting a signal requesting the secondary wireless device perform measurements for the at least one state; and
    receiving, from the secondary wireless device and in response to the signal, a measurement report for the at least one state, wherein determining the at least one other BPL is based at least in part on the received measurement report.

11. The method of claim 9, further comprising:
    communicating, based at least in part on the configuration, with the secondary wireless device by cycling through the plurality of BPLs including the at least one other BPL by selecting the BPL corresponding to the respective state of the secondary wireless device.

12. The method of claim 8, further comprising:
    transmitting, to the secondary wireless device, an indication to resume operation in accordance with the plurality of states, wherein the operation is resumed from at least one of a beginning of the plurality of states or a designated state of the plurality of states.

13. The method of claim 1, further comprising:
    determining, based at least in part on at least one BPL having a link quality that does not satisfy a threshold, to utilize repeated transmissions for at least one state of the plurality of states; and
    transmitting, to the secondary wireless device, a configuration that modifies communications with the secondary wireless device for the at least one state of the plurality of states, wherein the configuration enables the repeated transmissions.

14. The method of claim 13, wherein the repeated transmissions comprise at least one of repetitions of a packet using a same BPL or repetitions of the packet using two or more different BPLs.

15. The method of claim 13, wherein the repeated transmissions comprise simultaneous repetitions of a packet using two or more BPLs.

16. The method of claim 13, further comprising:
    determining at least one of a number of the repeated transmissions, a corresponding BPL for each repeated transmission, or corresponding BPLs for simultaneous transmissions, wherein the configuration that modifies the communications with the secondary wireless device comprises an indication of at least one of the number of the repeated transmissions, the corresponding BPL for each repeated transmission, or the corresponding BPLs for the simultaneous transmissions.

17. The method of claim 1, further comprising:
identifying, for at least one state of the plurality of states, at least one BPL of the plurality of BPLs having a link quality that does not satisfy a threshold; and
transmitting, to the secondary wireless device, a configuration that modifies communications with the secondary wireless device for the at least one state of the plurality of states, the configuration comprising an adjusted plurality of states that excludes the at least one state.

18. The method of claim 1, further comprising:
transmitting, to the secondary wireless device, a configuration of an order of the plurality of states; and
communicating with the secondary wireless device by cycling through the plurality of BPLs by selecting a BPL corresponding to the respective state in accordance with the order of the plurality of states.

19. A method for wireless communication at a secondary wireless device, comprising:
transmitting, to a controlling wireless device, an indication of a plurality of states of the secondary wireless device, each state of the plurality of states corresponding to at least one of a position or orientation of the secondary wireless device, the position or orientation being predetermined;
determining, based at least in part on the plurality of states of the secondary wireless device, a plurality of beam pair links (BPLs) for communicating with the controlling wireless device in the plurality of states, each BPL of the plurality of BPLs corresponding to a respective state of the plurality of states; and
communicating with the controlling wireless device based at least in part on the plurality of BPLs and the plurality of states.

20. The method of claim 19, further comprising:
communicating with the controlling wireless device by cycling through the plurality of BPLs by selecting a BPL corresponding to the respective state of the secondary wireless device.

21. The method of claim 19, further comprising:
performing a set of measurements for each state of the plurality of states; and
transmitting, to the controlling wireless device, a measurement report comprising an indication of the each BPL corresponding to the respective state of the plurality of states, wherein determining the plurality of BPLs is based at least in part on the set of measurements.

22. The method of claim 19, wherein determining the plurality of BPLs comprises:
identifying a plurality of transmit beams and receive beams having a link quality that satisfies a threshold, wherein respective transmit beams and receive beams of the plurality of transmit beams and receive beams are for communicating at least one of a control resource set (CORESET), physical downlink shared channel (PDSCH), a physical uplink control channel (PUCCH), or a sounding reference signal (SRS).

23. The method of claim 22, further comprising:
receiving, from the controlling wireless device, an indication of a transmission configuration indicator (TCI) state for at least one of the CORESET or the PDSCH for a corresponding state; and
identifying transmit beams and receive beams corresponding to at least one of the CORESET or the PDSCH based at least in part on the received indication.

24. The method of claim 22, further comprising:
receiving, from the controlling wireless device, an indication of a spatial relationship for at least one of the PUCCH or the SRS for a corresponding state; and
identifying transmit beams and receive beams corresponding to at least one of the PUCCH or the SRS based at least in part on the received indication.

25. The method of claim 19, wherein each state of the plurality of states utilizes one or more BPLs for simultaneous transmissions.

26. The method of claim 19, further comprising:
receiving, from the controlling wireless device, a configuration that modifies communications with the controlling wireless device for at least one state of the plurality of states, the configuration received based at least in part on at least one BPL of the plurality of BPLs having a link quality that does not satisfy a threshold.

27. The method of claim 26, wherein the configuration that modifies the communications with the controlling wireless device replaces the at least one BPL with at least one other BPL having a link quality that satisfies the threshold for the at least one state.

28. The method of claim 27, further comprising:
receiving a signal requesting the secondary wireless device perform measurements for the at least one state;
performing a set of measurements for the at least one state; and
transmitting, to the controlling wireless device and in response to the signal, a measurement report for the at least one state, wherein the at least one other BPL is based at least in part on the set of measurements.

29. The method of claim 27, further comprising:
communicating, based at least in part on the configuration, with the controlling wireless device by cycling through the plurality of BPLs including the at least one other BPL by selecting the BPL corresponding to the respective state of the secondary wireless device.

30. The method of claim 26, further comprising:
receiving, from the controlling wireless device, an indication to resume operation in accordance with the plurality of states, wherein the operation is resumed from at least one of a beginning of the plurality of states or a designated state of the plurality of states.

31. The method of claim 19, further comprising:
receiving, from the controlling wireless device, a configuration that modifies communications with the controlling wireless device for at least one state of the plurality of states, wherein the configuration enables repeated transmissions based at least in part on at least one BPL of the plurality of BPLs having a link quality that does not satisfy a threshold.

32. The method of claim 31, wherein the repeated transmissions comprise at least one of repetitions of a packet using a same BPL or repetitions of the packet using two or more different BPLs.

33. The method of claim 31, wherein the repeated transmissions comprise simultaneous repetitions of a packet using two or more BPLs.

34. The method of claim 31, wherein the configuration that modifies the communications with the controlling wireless device comprises an indication of at least one of a number of repeated transmissions, a corresponding BPL for each repeated transmission, or a corresponding BPLs for simultaneous transmissions.

35. The method of claim 19, further comprising:
receiving, from the controlling wireless device, a configuration that modifies communications with the controlling wireless device for at least one state of the plurality of states based at least in part on at least one BPL of the plurality of BPLs having a link quality that does not satisfy a threshold, the configuration comprising an adjusted plurality of states that excludes the at least one state.

36. The method of claim 19, further comprising:
receiving, from the controlling wireless device, a configuration of an order of the plurality of states; and
communicating with the controlling wireless device by cycling through the plurality of BPLs by selecting a BPL corresponding to the respective state in accordance with the order of the plurality of states.

37. An apparatus for wireless communication at a controlling wireless device, comprising:
a processor,
memory in electronic communication with the processor; and
instructions stored in the memory and executable by the processor to cause the apparatus to:
receive an indication of a plurality of states of a secondary wireless device, each state of the plurality of states corresponding to at least one of a position or orientation of the secondary wireless device, the position or orientation being predetermined;
determine, based at least in part on the plurality of states of the secondary wireless device, a plurality of beam pair links (BPLs) for communicating with the secondary wireless device in the plurality of states, each BPL of the plurality of BPLs corresponding to a respective state of the plurality of states; and
communicate with the secondary wireless device based at least in part on the plurality of BPLs and the plurality of states.

38. The apparatus of claim 37, wherein the instructions are further executable by the processor to cause the apparatus to:
communicate with the secondary wireless device by cycling through the plurality of BPLs by selecting a BPL corresponding to the respective state of the secondary wireless device.

39. The apparatus of claim 37, wherein the instructions are further executable by the processor to cause the apparatus to:
receive, from the secondary wireless device, a measurement report comprising an indication of the each BPL corresponding to the respective state of the plurality of states, wherein determining the plurality of BPLs is based at least in part on the received measurement report.

40. The apparatus of claim 37, wherein the instructions to determine the plurality of BPLs are executable by the processor to cause the apparatus to:
identify a plurality of transmit beams and receive beams having a link quality that satisfies a threshold, wherein respective transmit beams and receive beams of the plurality of transmit beams and receive beams are for communicating at least one of a control resource set (CORESET), physical downlink shared channel (PDSCH), a physical uplink control channel (PUCCH), or a sounding reference signal (SRS).

41. The apparatus of claim 40, wherein the instructions are further executable by the processor to cause the apparatus to:
transmit, to the secondary wireless device, an indication of a transmission configuration indicator (TCI) state for at least one of the CORESET or the PDSCH for a corresponding state.

42. The apparatus of claim 40, wherein the instructions are further executable by the processor to cause the apparatus to:
transmit, to the secondary wireless device, an indication of a spatial relationship for at least one of the PUCCH or the SRS for a corresponding state.

43. The apparatus of claim 37, wherein each state of the plurality of states utilizes one or more BPLs for simultaneous transmissions.

44. The apparatus of claim 37, wherein the instructions are further executable by the processor to cause the apparatus to:
identify, for at least one state of the plurality of states, at least one BPL of the plurality of BPLs having a link quality that does not satisfy a threshold; and
transmit, to the secondary wireless device, a configuration that modifies communications with the secondary wireless device for the at least one state of the plurality of states.

45. The apparatus of claim 44, wherein the instructions are further executable by the processor to cause the apparatus to:
determine, based at least in part on the at least one BPL having the link quality that does not satisfy the threshold, at least one other BPL having a link quality that satisfies the threshold,
wherein the configuration that modifies the communications with the secondary wireless device replaces the at least one BPL with the at least one other BPL for the at least one state.

46. The apparatus of claim 45, wherein the instructions are further executable by the processor to cause the apparatus to:
transmit a signal requesting the secondary wireless device perform measurements for the at least one state; and
receive, from the secondary wireless device and in response to the signal, a measurement report for the at least one state, wherein determining the at least one other BPL is based at least in part on the received measurement report.

47. The apparatus of claim 45, wherein the instructions are further executable by the processor to cause the apparatus to:
communicate, based at least in part on the configuration, with the secondary wireless device by cycling through the plurality of BPLs including the at least one other BPL by selecting the BPL corresponding to the respective state of the secondary wireless device.

48. An apparatus for wireless communication at a secondary wireless device, comprising:
a processor,
memory in electronic communication with the processor; and
instructions stored in the memory and executable by the processor to cause the apparatus to:
transmit, to a controlling wireless device, an indication of a plurality of states of the secondary wireless device, each state of the plurality of states corresponding to at least one of a position or orientation of the secondary wireless device, the position or orientation being predetermined;

determine, based at least in part on the plurality of states of the secondary wireless device, a plurality of beam pair links (BPLs) for communicating with the controlling wireless device in the plurality of states, each BPL of the plurality of BPLs corresponding to a respective state of the plurality of states; and communicate with the controlling wireless device based at least in part on the plurality of BPLs and the plurality of states.

49. The apparatus of claim 48, wherein the instructions are further executable by the processor to cause the apparatus to:

communicate with the controlling wireless device by cycling through the plurality of BPLs by selecting a BPL corresponding to the respective state of the secondary wireless device.

50. The apparatus of claim 48, wherein the instructions are further executable by the processor to cause the apparatus to:

perform a set of measurements for each state of the plurality of states; and transmit, to the controlling wireless device, a measurement report comprising an indication of the each BPL corresponding to the respective state of the plurality of states, wherein determining the plurality of BPLs is based at least in part on the set of measurements.

51. The apparatus of claim 48, wherein the instructions to determine the plurality of BPLs are executable by the processor to cause the apparatus to:

identify a plurality of transmit beams and receive beams having a link quality that satisfies a threshold, wherein respective transmit beams and receive beams of the plurality of transmit beams and receive beams are for communicating at least one of a control resource set (CORESET), physical downlink shared channel (PDSCH), a physical uplink control channel (PUCCH), or a sounding reference signal (SRS).

52. The apparatus of claim 51, wherein the instructions are further executable by the processor to cause the apparatus to:

receive, from the controlling wireless device, an indication of a transmission configuration indicator (TCI) state for at least one of the CORESET or the PDSCH for a corresponding state; and identify transmit beams and receive beams corresponding to at least one of the CORESET or the PDSCH based at least in part on the received indication.

53. The apparatus of claim 51, wherein the instructions are further executable by the processor to cause the apparatus to:

receive, from the controlling wireless device, an indication of a spatial relationship for at least one of the PUCCH or the SRS for a corresponding state; and identify transmit beams and receive beams corresponding to at least one of the PUCCH or the SRS based at least in part on the received indication.

54. The apparatus of claim 48, wherein each state of the plurality of states utilizes one or more BPLs for simultaneous transmissions.

55. The apparatus of claim 48, wherein the instructions are further executable by the processor to cause the apparatus to:

receive, from the controlling wireless device, a configuration that modifies communications with the controlling wireless device for at least one state of the plurality of states, the configuration received based at least in part on at least one BPL of the plurality of BPLs having a link quality that does not satisfy a threshold.

56. The apparatus of claim 55, wherein the configuration that modifies the communications with the controlling wireless device replaces the at least one BPL with at least one other BPL having a link quality that satisfies the threshold for the at least one state.

57. The apparatus of claim 56, wherein the instructions are further executable by the processor to cause the apparatus to:

receive a signal requesting the secondary wireless device perform measurements for the at least one state;

perform a set of measurements for the at least one state; and transmit, to the controlling wireless device and in response to the signal, a measurement report for the at least one state, wherein the at least one other BPL is based at least in part on the set of measurements.

58. The apparatus of claim 56, wherein the instructions are further executable by the processor to cause the apparatus to:

communicate, based at least in part on the configuration, with the controlling wireless device by cycling through the plurality of BPLs including the at least one other BPL by selecting the BPL corresponding to the respective state of the secondary wireless device.

59. An apparatus for wireless communication at a controlling wireless device, comprising:

means for receiving an indication of a plurality of states of a secondary wireless device, each state of the plurality of states corresponding to at least one of a position or orientation of the secondary wireless device, the position or orientation being predetermined;

means for determining, based at least in part on the plurality of states of the secondary wireless device, a plurality of beam pair links (BPLs) for communicating with the secondary wireless device in the plurality of states, each BPL of the plurality of BPLs corresponding to a respective state of the plurality of states; and means for communicating with the secondary wireless device based at least in part on the plurality of BPLs and the plurality of states.

60. An apparatus for wireless communication at a secondary wireless device, comprising:

means for transmitting, to a controlling wireless device, an indication of a plurality of states of the secondary wireless device, each state of the plurality of states corresponding to at least one of a position or orientation of the secondary wireless device, the position or orientation being predetermined;

means for determining, based at least in part on the plurality of states of the secondary wireless device, a plurality of beam pair links (BPLs) for communicating with the controlling wireless device in the plurality of states, each BPL of the plurality of BPLs corresponding to a respective state of the plurality of states; and means for communicating with the controlling wireless device based at least in part on the plurality of BPLs and the plurality of states.

* * * * *